(12) United States Patent
Ito et al.

(10) Patent No.: US 7,188,697 B2
(45) Date of Patent: Mar. 13, 2007

(54) POWER UNIT FOR VEHICLE WITH INTERNAL COMBUSTION ENGINE

(75) Inventors: Katsuhiko Ito, Wako (JP); Masaaki Negoro, Wako (JP); Shinichiro Keyaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 573 days.

(21) Appl. No.: 10/664,986

(22) Filed: Sep. 17, 2003

(65) Prior Publication Data

US 2004/0123596 A1    Jul. 1, 2004

(30) Foreign Application Priority Data

Sep. 18, 2002    (JP)    ............... 2002-272335

(51) Int. Cl.
    *B60K 5/00*    (2006.01)
(52) U.S. Cl. ............ 180/293; 180/292; 180/230; 74/732.1; 74/730.1
(58) Field of Classification Search ............ 180/293, 180/292, 230; 74/732.1, 730.1
    See application file for complete search history.

(56) References Cited

U.S. PATENT DOCUMENTS

| 5,584,214 | A  | * | 12/1996 | Hayashi et al. | ............ 74/732.1 |
| 6,357,413 | B1 | * | 3/2002  | Ito et al.     | ............ 123/197.1 |
| 6,357,545 | B1 | * | 3/2002  | Hori et al.    | ............ 180/219 |
| 6,470,770 | B2 | * | 10/2002 | Ito et al.     | ............ 74/730.1 |
| 6,896,087 | B2 | * | 5/2005  | Korenjak et al.| ............ 180/292 |

FOREIGN PATENT DOCUMENTS

| JP | 9-183393   | 7/1997 |
| JP | 2001-343060| 12/2001 |

* cited by examiner

*Primary Examiner*—Christopher P. Ellis
*Assistant Examiner*—John Walters
(74) *Attorney, Agent, or Firm*—Hamre, Schumann, Mueller, & Larson, PC

(57) ABSTRACT

A power unit for a vehicle with an internal combustion engine including a cylinder block and a crankshaft. A speed change drive shaft is disposed at a position on the upper side of a static oil hydraulic type non-stage transmission and in parallel to the axis of the transmission. A plane connecting the axis of the speed change drive shaft and the axis of the transmission does not intersect with the axis of the crankshaft, and intersects with the axis of the cylinder center axis of the cylinder block at a position on the lower side of the axis of the crankshaft while making an acute angle with the axis of the cylinder center axis of the cylinder block.

13 Claims, 22 Drawing Sheets

POWER UNIT FOR VEHICLE WITH INTERNAL COMBUSTION ENGINE

BACKGROUND OF THE INVENTION

1. Field of the Invention

The present invention relates to a power unit for a vehicle with an internal combustion engine for transmitting the power of the internal combustion engine to the wheels of the vehicle through a static oil hydraulic type non-stage transmission.

2. Description of the Related Art

Power units for vehicles are known. For example, Japanese Patent Laid-open No. Hei 9-183393 discloses a power unit for a vehicle in which a static oil hydraulic type non-stage transmission including a swash plate type oil hydraulic pump and a swash plate type oil hydraulic motor that is comparatively small in weigh and size, and capable of non-stage speed change.

In the power unit described in Japanese Patent Laid-open No. Hei 9-183393, a crankshaft is disclosed on the downward extension of the cylinder center axis directed substantially in the vertical direction, and the axis of the transmission and the axis of a speed change drive shaft are disposed on a line making an acute angle with the crankshaft, in relation to the downward extension of the cylinder center axis. Therefore, the speed change drive shaft bulges to a lateral side of the internal combustion engine, and the left-right dimension is enlarged. This can decrease the mountability of the power unit on the vehicle body.

On the other hand, in a power unit for a vehicle with an internal combustion engine as described in Japanese Patent Laid-open No. 2001-343060, a static oil hydraulic type non-stage transmission is disposed on either one of the left and right sides of an internal combustion engine having a cylinder center axis directed substantially in the vertical direction, and a speed change drive shaft is disposed on the outer lateral side of the internal combustion with the static oil hydraulic type non-stage transmission therebetween. Therefore, again, the size in the left-right direction of the power unit is enlarged, so that it is difficult to mount the power unit on the vehicle body in a compact fashion.

Moreover, in the power unit described in Japanese Patent Laid-open No. 2001-343060, a speed sensor for detecting the speed change ratio of the static oil hydraulic type non-stage transmission is disposed on the upper side of the static oil hydraulic type non-stage transmission. Therefore, it has been difficult to easily perform maintenance and inspection of the speed change ratio sensor, due to interference caused by a fuel tank, a seat or a vehicle body cover disposed on the upper side of the power unit.

The present invention overcomes the above-mentioned difficulties in the prior art.

SUMMARY OF THE INVENTION

In one aspect of the present invention, a power unit for vehicle with internal combustion engine is provided. The engine includes a cylinder block having a cylinder center axis directed substantially in the vertical direction and a crankshaft. The power unit further comprises a static oil hydraulic type non-state transmission for speed-changing the rotation from the crankshaft, the static oil hydraulic type non-state transmission including a swash plate type oil hydraulic pump and a swash plate type oil hydraulic motor disposed coaxially; and a speed change drive shaft for reciprocating a drive member for changing the inclination angle of the swash plate type oil hydraulic motor or the swash plate type oil hydraulic pump. The speed change drive shaft is disposed at a position on the upper side of the static oil hydraulic type non-stage transmission and in parallel to the axis of the static oil hydraulic type non-stage transmission. A plane connecting the axis of the speed change drive shaft and the axis of the static oil hydraulic type non-stage transmission does not intersect with the axis of the crankshaft, and intersects with the axis of the cylinder center axis of the cylinder block at a position on the lower side of the axis of the crankshaft while making an acute angle with the axis of the cylinder center axis of the cylinder block.

In another aspect, a power unit for a vehicle with an internal combustion engine is provided. The power unit comprises an internal engine having a cylinder block having a cylinder center axis directed substantially in the vertical direction and a crankshaft; transmission means for speed-changing the rotation from the crankshaft, the transmission means including a swash plate type oil hydraulic pump and a swash plate type oil hydraulic motor disposed coaxially; and reciprocating means for reciprocating a drive member for changing the swash plate angle of the swash plate type oil hydraulic motor or the swash plate type oil hydraulic pump. The reciprocating means is disposed at a position on the upper side of the transmission means and in parallel to the axis of the transmission means. A plane connecting the axis of the reciprocating means and the axis of the transmission means does not intersect with the axis of the crankshaft, and intersects with the axis of the cylinder center axis of the cylinder block at a position on the lower side of the axis of the crankshaft while making an acute angle with the axis of the cylinder center axis of the cylinder block.

Therefore, by these arrangements, the widths in the vertical and horizontal directions of the power unit for vehicle with internal combustion engine relative to the crankshaft are decreased, and the mountability of the power unit on the vehicle is improved.

In another aspect of the present invention, a speed change ratio sensor for detecting the speed change ratio of the static oil hydraulic type non-state transmission is disposed on a lateral side of the static oil hydraulic type non-stage transmission. Therefore, maintenance and inspection of the speed change ratio sensor can be easily carried out from the lateral side of the vehicle.

In yet another aspect, a breather chamber is disposed at a high position inside a crankcase. Therefore, droplets of lubricating oil generated due to raking-up of the lubricating oil by rotary members such as a crank and a counter shaft are inhibited from penetrating into the breather chamber by the static oil hydraulic type non-stage transmission disposed directly below the breather chamber. Thus, a blow-by gas with a low oil mist mixing ratio is introduced into the breather chamber, having results that the capacity of the breather chamber may be smaller, and the internal structure is simplified.

In another aspect, the crankshaft is directed in the front-rear direction of the vehicle body. Therefore, the dimension in the vehicle width direction of the power unit is reduced, the mountability of the power unit on the vehicle body is further enhanced, and maintenance, inspection and repair of the speed change ratio sensor can be performed more easily.

DETAILED DESCRIPTION OF THE INVENTION

Figure 1:
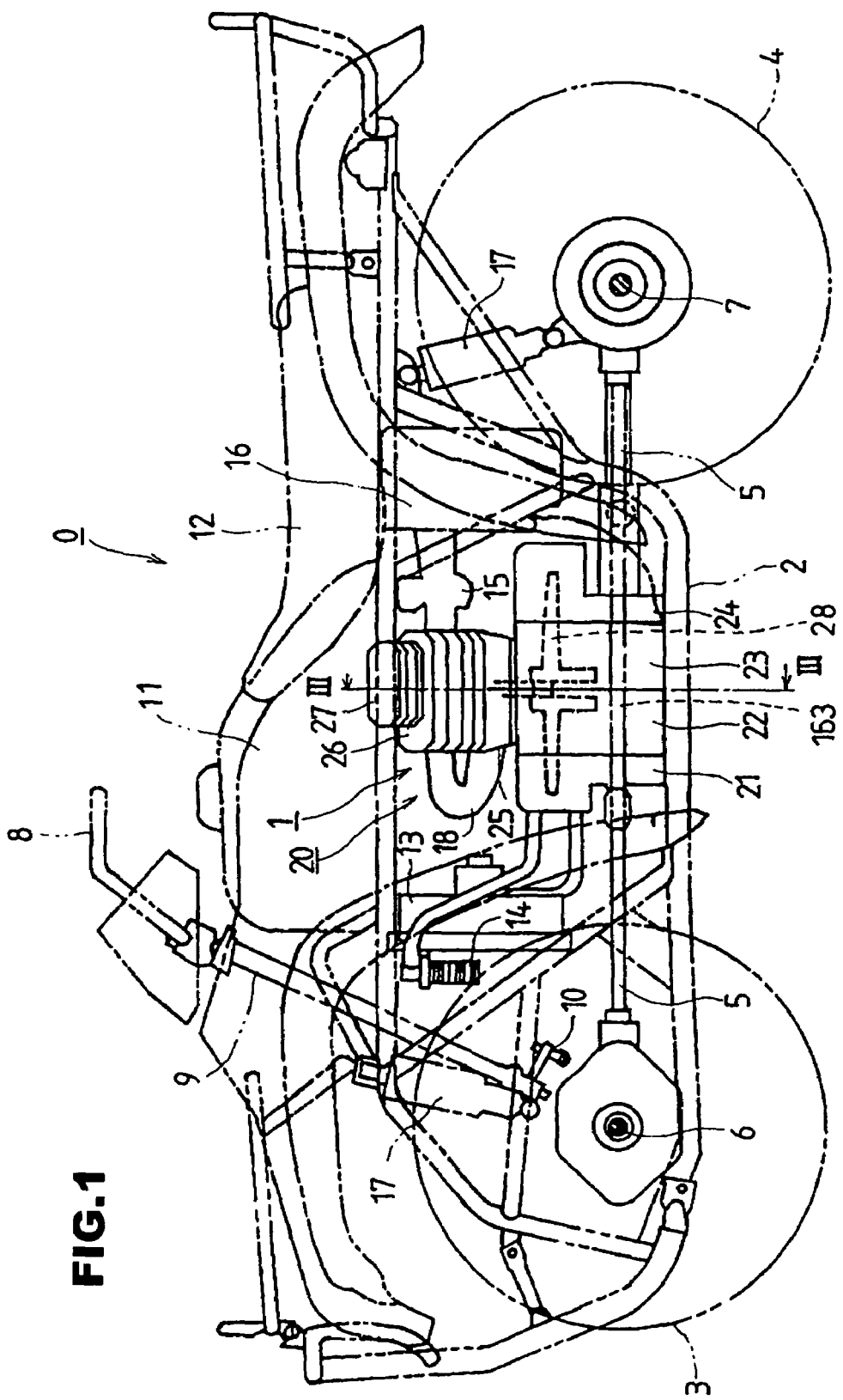
FIG. 1 is a side view of a vehicle on which a power unit according to the present invention is mounted.

Now, an embodiment of a power unit for a vehicle with an internal combustion engine 1 according to the present invention shown in the drawings will be described. In this embodiment, the upward and downward directions mean the upward and downward directions with respect to the vehicle body, the front side means the front side with respect to the vehicle body, the rear side means the rear side with respect to the vehicle body, and the left and right mean the left and right as viewed from a person directed toward the front side.

Overall Structure

As shown in FIG. 1, in an off-road four-wheel vehicle 0 on which the power unit for vehicle with internal combustion engine 1 is mounted, pairs of front wheels 3 and rear wheels 4 are disposed respectively at front and rear portions of a vehicle body frame 2, the front end rear ends of transmission shafts directed in the forward and rearward directions from the power unit for vehicle with internal combustion engine 1 are connected to the front wheel 3 and the rear wheel 4 through differential devices (not shown) and a front axle 6 and a rear axle 7, respectively, and the four-wheel vehicle 0 can run in a four-wheel drive mode by the power from the power unit 1.

In addition, the four-wheel vehicle 0 includes a bar handle 8 at a central portion in the width direction on the front side, a steering mechanism 10 is provided at the lower end of a steering shaft 9 connected to the bar handle 8, and a swiveling operation on the bar handle 8 is transmitted to the front wheels 3 through the steering shaft 9 and the steering mechanism 10, whereby the four-wheel vehicle 0 can be turned to the left or the right.

Further, a fuel tank 11 is mounted on the vehicle body frame 2 while being located on the upper side of the power unit 1, a seat 12 is mounted on the rear side thereof, a fan 13 and an oil cooler 14 are sequentially disposed on the front side of the power unit 1, a carburetor 15 and an air cleaner 16 are sequentially disposed on the rear side of the power unit for vehicle with internal combustion engine 1, and the front axle 6 and the rear axle 7 are supported on the vehicle body frame 2 through shock absorbers 17.

Figure 2:
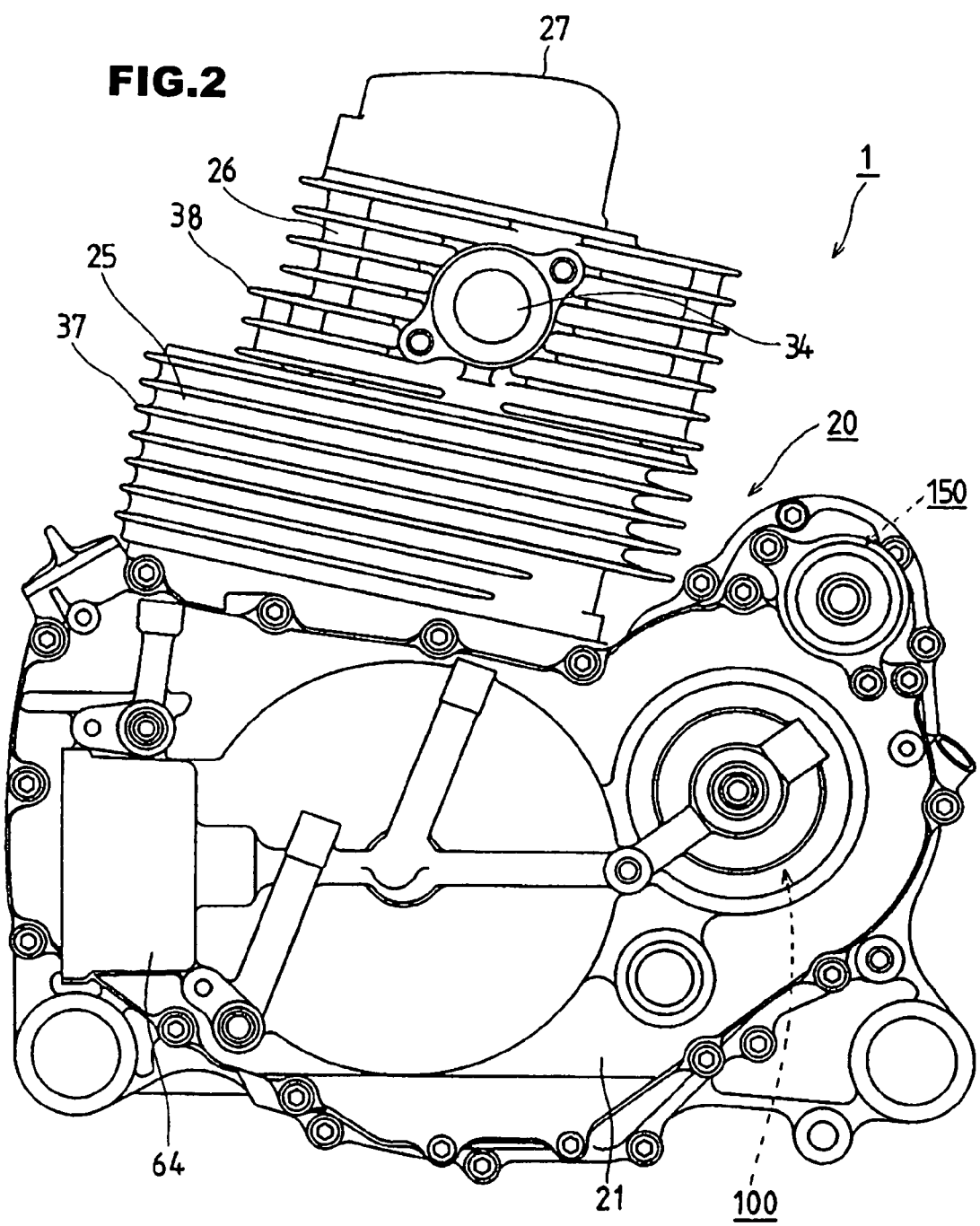
FIG. 2 is a front view, as viewed from the front side, of the power unit shown in FIG. 1.
Figure 3:
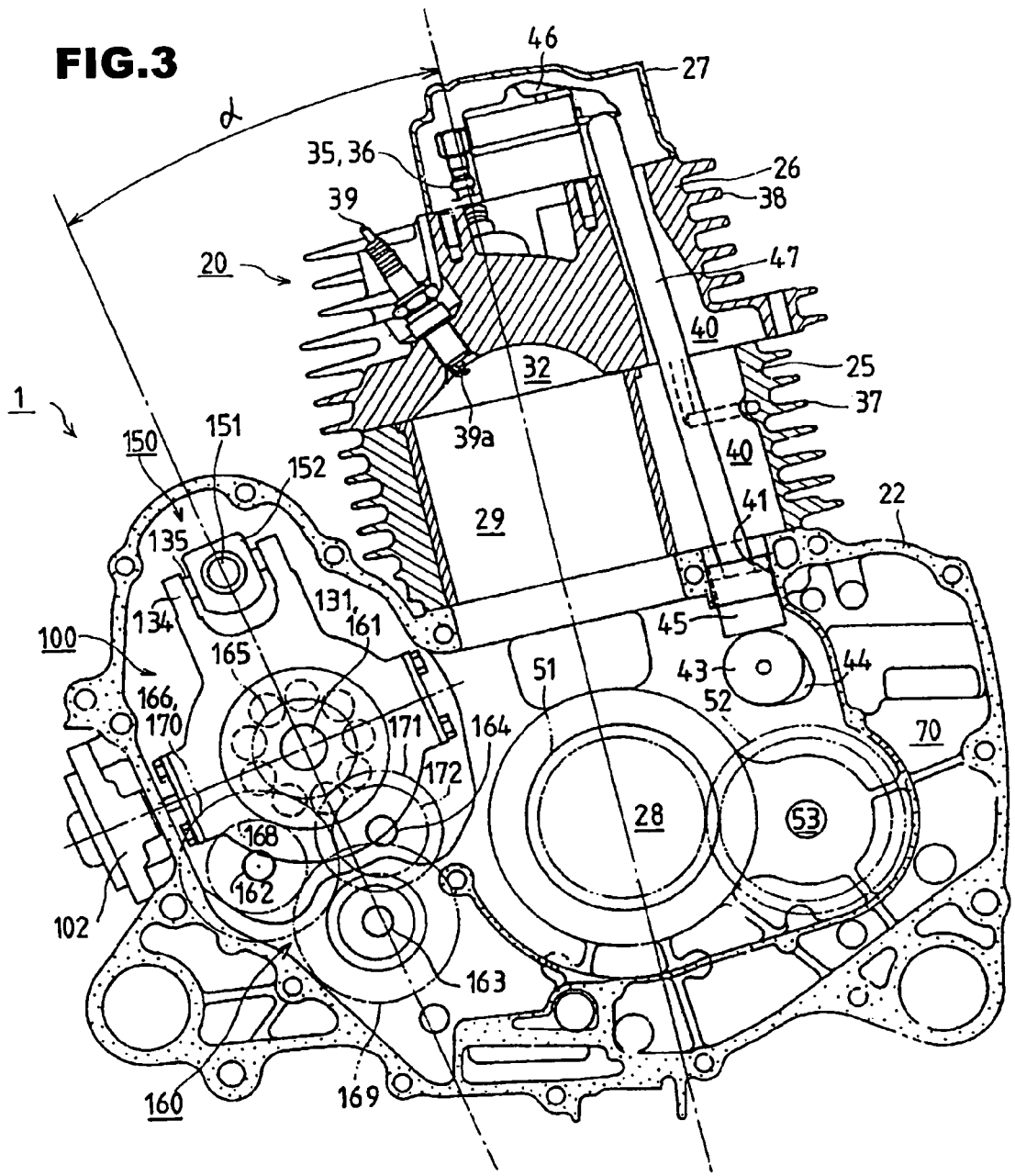
FIG. 3 is a cross-sectional view of the power unit for vehicle with internal combustion engine, taken along line III—III of FIG. 1.
Figure 4:
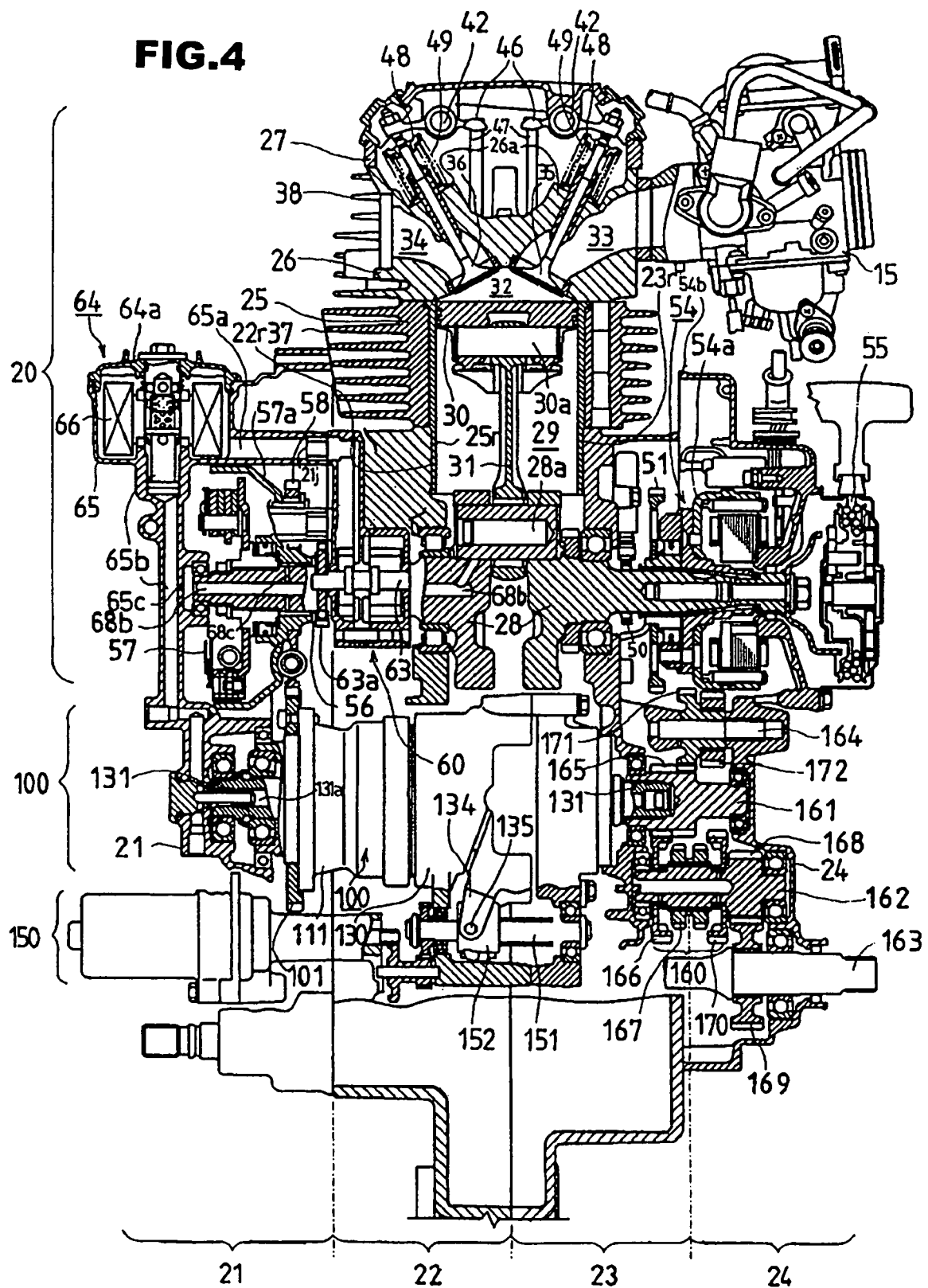
FIG. 4 is a vertical sectional view of the power unit for vehicle with internal combustion engine shown in FIG. 1.
Figure 5:
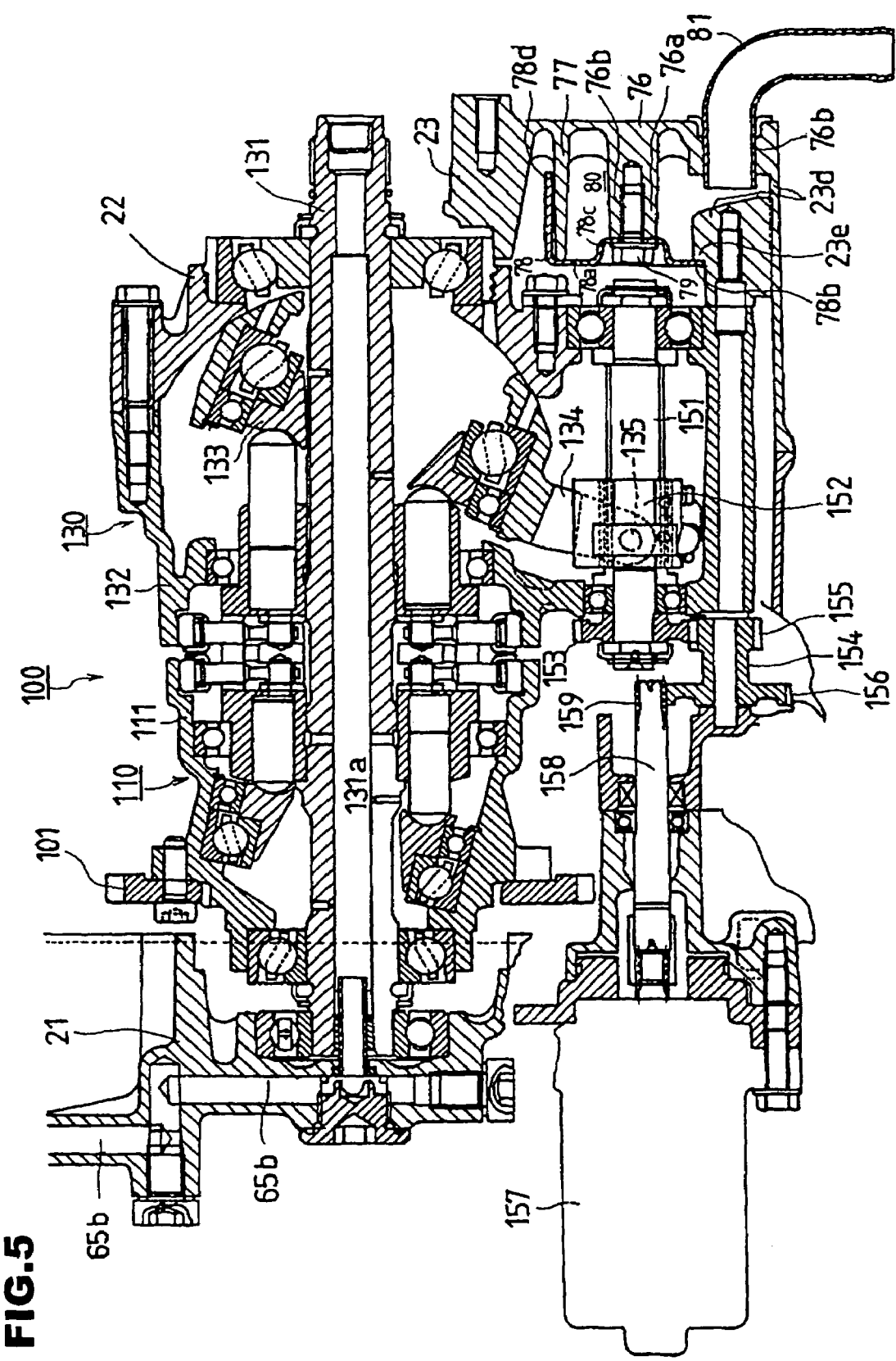
FIG. 5 is a vertical sectional view of a static oil hydraulic type non-stage transmission of the present invention.

Furthermore, as shown in FIGS. 2, 3 and 4, the power unit 1 includes a 4-stroke-cycle internal combustion engine 20, a static oil hydraulic type non-stage transmission 100, and a speed change drive shaft controller 150. The 4-stroke-cycle internal combustion engine 20 is an overhead-valve push-rod type single-cylinder internal combustion engine having a cylinder center axis in the vertical direction with respect to the front-rear direction, as shown in FIG. 1, and slightly inclined from the vertical direction to the left, as viewed forwards from the rear side of the vehicle body, with respect to the left-right direction, as shown in FIG. 3. As shown in FIGS. 4 and 5, the static oil hydraulic type non-stage transmission 100 is a transmission in which a swash plate type oil hydraulic pump 110 and a swash plate type oil hydraulic motor 130 are disposed on the same axis in the front-rear direction and which changes the speed of rotation from a crankshaft 28 of the 4-stroke-cycle internal combustion engine 20. The speed change drive shaft controller 150 includes a speed change drive shaft 151 for reciprocating a drive member 152 for changing the swash plate angle of the swash plate type oil hydraulic pump of the swash plate type oil hydraulic motor 130.

In addition, in the 4-stroke-cycle internal combustion engine 20, as shown in FIGS. 1 and 4, a crankcase is partitioned into four portions, namely, into a front case cover 21, a front crankcase 22, a rear crankcase 23 and a rear case cover 24 in the front-rear direction, with vertical planes directed in the vehicle width direction as faying surfaces, a cylinder block 25, a cylinder head 26 and a head cover 27 are sequentially stacked on the upper side of the front crankcase 22 and the rear crankcase 23 at the center in the front-rear direction, and the front case cover 21, the front crankcase 22, the rear crankcase 23, the rear case cover 24, the cylinder block 25, the cylinder head 26 and the head cover 27 are mutually integrally connected by bolts and the like which are not shown.

Further, as shown in FIG. 3 (the many-dotted portion in the figure means a faying surface between one member and another), the crankshaft 28 is rotatably borne on the front crankcase 22 and the rear crankcase 23 while being directed in the front-rear direction (see FIG. 4), and a piston 30 is slidably fitted in a cylinder bore 29 in the cylinder block 25 directed roughly in the vertical direction. The upper and lower ends of a connecting rod 31 are rotatably fitted on a piston pin 30a inserted in the piston 30 and a crank pin 28a on the crankshaft 28, and the crank shaft 28 is driven to rotate by the pressure of a combustion gas generated by the combustion of a mixture gas that is sucked into a combustion chamber 32 surrounded by the cylinder bore 29, the cylinder head 26 and the piston 30.

Furthermore, the cylinder head 26 is provided with an intake port 33 opened rearwards and an exhaust port 34 opened forwards, and is provided with an intake valve 35 and an exhaust valve 36 for openably closing the ports of the intake port 33 and the exhaust port 34 on the side of the combustion chamber 32, respectively. The carburetor 15 and the air cleaner 16 (see FIG. 1) are connected to a rear opening portion of the intake port 33, whereas an exhaust gas clarifier, a muffler and the like, which are not shown, are connected to a front opening portion of the exhaust port 34 through an exhaust pipe 18. As shown in FIG. 3, a spark plug 39 is screwed to the cylinder head 26 so that an electrode portion 39a of the spark plug 39 faces the combustion chamber 32.

The cylinder block 25 and the cylinder head 26 are provided with cooling fins 37 and cooling fins 38, respectively. A running airflow arising from the running of the vehicle and a cooling airflow generated by a fan 13 come into contact with the cooling fins 37 and 38, whereby the 4-stroke-cycle internal combustion engine 20 is cooled. Also, as will be described later, the 4-stroke-cycle internal combustion engine 20 is cooled by a cooling lubricating oil that passes inside the cylinder block 25 and the cylinder head 26.

In addition, as shown in FIG. 3, in the cylinder block 25 and the cylinder head 26, a communication hole 40 is formed on the right side of the cylinder bore 29 and substantially in parallel to the cylinder bore 29, and a circular guide hole 41 is formed in top walls of the front crankcase 22 and the rear crankcase 23 at a position directly below the communication hole 40. At a position on the downward extension of the communication hole 40 and the guide hole 41, a camshaft 43 is rotatably borne on camshaft pivot holes 67c and 71c provided in partition walls 67 and 71 of the front crankcase 22 and the rear crankcase 23. A valve lifter 45 slidably fitted in the guide hole 41 is brought into contact with a cam 44 on the camshaft 43. A front-rear pair of rocker arms 46 are oscillatably borne on the cylinder head 26, with rocker shafts 42 shown in FIG. 4 therebetween, in parallel to contact surfaces between the cylinder block 25, the cylinder head 26 and the head cover 27. A push rod 47 is interposed between one end portion of the rocker arm 46 and the valve lifter 45, and the other end portion of the rocker arm 46 is brought into contact with the top end of the intake valve 35 or the exhaust valve 36. In each of the intake valve 35 and the exhaust valve 36, a valve spring 49 is interposed between a valve spring retainer 48 mounted on the top end and a spring receiving portion 26a of the cylinder head 26. A chain which is not shown is set around a drive sprocket 50 (see FIG. 4) fitted on the crankshaft 28 and a driven sprocket (not shown) fitted on the camshaft 43 and having a number of teeth of two times that of the drive sprocket 50. When the crankshaft 28 is rotated, the camshaft 43 is driven to rotate in a ratio of one revolution to two revolutions of the crankshaft 28, and the intake valve 35 and the exhaust valve 36 are opened and closed one time each corresponding to two revolutions of the crankshaft 28, with the same valve timing as that in an ordinary 4-stroke-cycle internal combustion engine.

As shown in FIG. 4, at a rear portion of the crankshaft 28, a balancer drive gear 51 is integrally mounted to the crankshaft 28 at a position on the rear side of the drive sprocket 50. As shown in FIG. 3, a balancer gear 52 meshed with the balancer drive gear 51 is borne on the front crankcase 22 and the rear crankcase 23 through a balancer shaft 53 at a position on the right side of the crankshaft 28. Further, an ACG 54 (AC generator) is disposed on the rear side of the balancer drive gear 51, a rotor 54a of the ACG 54 is fitted in the vicinity of a rear end portion of the crankshaft 28, a recoil starter 55 is provided at a rear end portion of the crankshaft 28 on the rear side of the rotor 54a, a pump drive gear 56 is integrally mounted to a front portion of the crankshaft 28, and a starting clutch 57 is provided at the front end of the crankshaft 28 at a position on the front side of the pump drive gear 56.

Further, as shown in FIG. 4, a drive gear 58 is integrally attached to a clutch outer 57a, which is an output member of the starting clutch 57. As shown in FIGS. 3 and 4, the static oil hydraulic type non-stage transmission 100, located slightly on the upper side and on the left side of the crankshaft 28, is disposed inside the front crankcase 22 and the rear crankcase 23. As shown in FIG. 5, an oil hydraulic motor rotary shaft 131 of the swash plate type oil hydraulic motor 130 in the static oil hydraulic type non-stage transmission 100 is rotatably borne on the front case cover 21 and the rear crankcase 23. A motor casing 132 of the swash plate type oil hydraulic motor 130 is rotatably borne on the oil hydraulic motor rotary shaft 131. A driven gear 101 is integrally attached to a pump casing 111 of the swash plate type oil hydraulic pump 110 rotatably borne on the oil hydraulic motor rotary shaft 131. As shown in FIG. 4, the driven gear 101 is meshed with the drive gear 58 of the starting clutch 57. When the drive gear 58 of the starting clutch 57 is rotated, the pump casing 111 of the swash plate type oil hydraulic pump 110 in the static oil hydraulic type non-stage transmission 100 is driven to rotate, with the oil hydraulic motor rotary shaft 131 as a center.

In addition, as shown in FIG. 4, a gear transmission 160 is disposed in the space surrounded by the rear crankcase 23 and the rear case cover 24, and a main shaft 161 of the gear transmission 160 is spline-fitted to the oil hydraulic motor rotary shaft 131 of the static oil hydraulic type non-stage transmission 100. As shown in FIG. 3, a counter shaft 162 is disposed at a position on the left lower side of the main shaft 161, and, further, an output shaft 163 is disposed at a position on the right lower side of the counter shaft 162 and the main shaft 161. The main shaft 161, the counter shaft 162 and the output shaft 163 are rotatably borne on the rear crankcase 23 and the rear case cover 24. A counter gear 166, normally in mesh with a main gear 165 integral with the main shaft 161, is rotatably mounted on the counter shaft 162, and a shifter 167 is mounted on the counter shaft 162 so that it cannot rotate but can axially slide in relation to the counter shaft 162. A counter output gear 168 integral with the counter shaft 162 and a gear 169 integral with the output shaft 163 mesh with each other. When the shifter 167 slides forwards by a change-over mechanism (not shown) so as to engage with the counter gear 166, the counter gear 166 and the counter shaft 162 are connected to each other, whereby the rotating force of the main shaft 161 is transmitted to the output shaft 163.

Moreover, as shown in FIG. 4, a reverse counter gear 170, located between the shifter 167 and the counter output gear 168, is rotatably mounted to the counter shaft 162. As shown in FIG. 3, a reverse shaft 164 located adjacent to the main shaft 161 and the counter shaft 162 is rotatably borne on the rear crankcase 23 and the rear case cover 24 (see FIG. 4), an input gear 171 on one side which is integral with the reverse shaft 164 is meshed with the main gear 165 on the main shaft 161, and an output gear 172 on the other side which is integral with the reverse shaft 164 is meshed with the reverse counter gear 170 on the counter shaft 162. When the shifter 167 slides rearwards, the counter output gear 168 and the counter shaft 162 are connected to each other, whereby the rotating force of the main shaft 161 is transmitted, in a reverse rotating condition, to the output shaft 163 through the reverse shaft 164 and the counter shaft 162.

Both the front and rear ends of the output shaft 163 are connected respectively to the transmission shafts 5 disposed on the front and rear sides of the power unit 1, so that the rotating force of the output shaft 163 is transmitted to the front wheels 3 and the rear wheels 4 through the transmission shafts 5 and through the front axle 6 and the rear axle 7.

In addition, as shown in FIG. 3, the speed change drive shaft controller 150 is disposed on the upper left side of the power unit 1, and the angle α between a plane connecting the center line of the speed change drive gear 151 of the speed change drive shaft controller 150 and the center line of the oil hydraulic motor rotary shaft 131 of the static oil hydraulic type non-stage transmission 100 and the center line of the cylinder bore 29 of the 4-stroke-cycle internal combustion engine 20 is as extremely small as about 10°.

Further, as shown in FIGS. 3 and 4, the speed change drive shaft 151 of the speed change drive shaft controller 150 is provided with a male screw at a central portion in the longitudinal direction thereof, and the drive member 152 is meshed with the speed change drive shaft 151 of the male screw. As shown in FIG. 5, the drive member 152 is oscillatably connected to arm portions 134, which project in a forked form from a motor swash plate 133 of the swash plate type oil hydraulic motor 130 in the static oil hydraulic type non-stage transmission 100, through a pin 135. As shown in FIG. 5, a gear 153 integral with the speed change drive shaft 151 is meshed with a small gear 155 of a speed reduction gear 154, and a large gear 156 of the speed reduction gear 154 is meshed with a pinion gear 159 integral with a rotary shaft 158 of a control motor 157. By the normal and reverse rotations of the control motor 157, the drive member is driven forwards and rearwards, whereby the inclination angle of the motor casing 132 of the swash plate type oil hydraulic motor 130 is controlled.

Furthermore, as shown in FIG. 3, along a plane orthogonal to the plane connecting the speed change drive shaft 151 of the speed change drive shaft controller 150 and the oil hydraulic motor rotary shaft 131 of the swash plate type oil hydraulic motor 130, a speed change ratio sensor 102 is disposed at a position on the left side of the swash plate type oil hydraulic motor 30.

Lubricating Oil Pump

Next, a lubricating oil pump 60 will be described.

Figure 6:
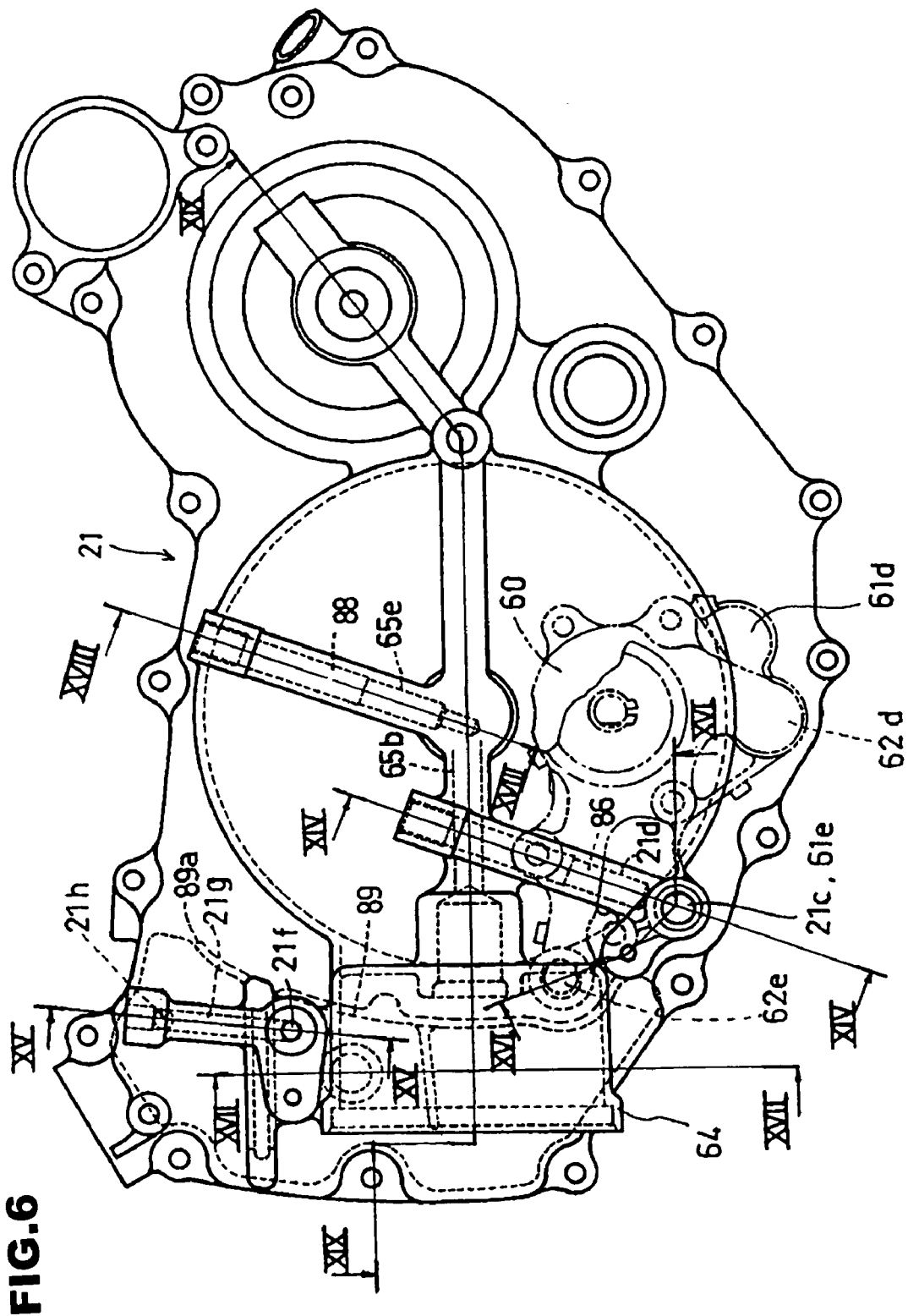
FIG. 6 is a front view of a front case cover of the present invention.
Figure 7:
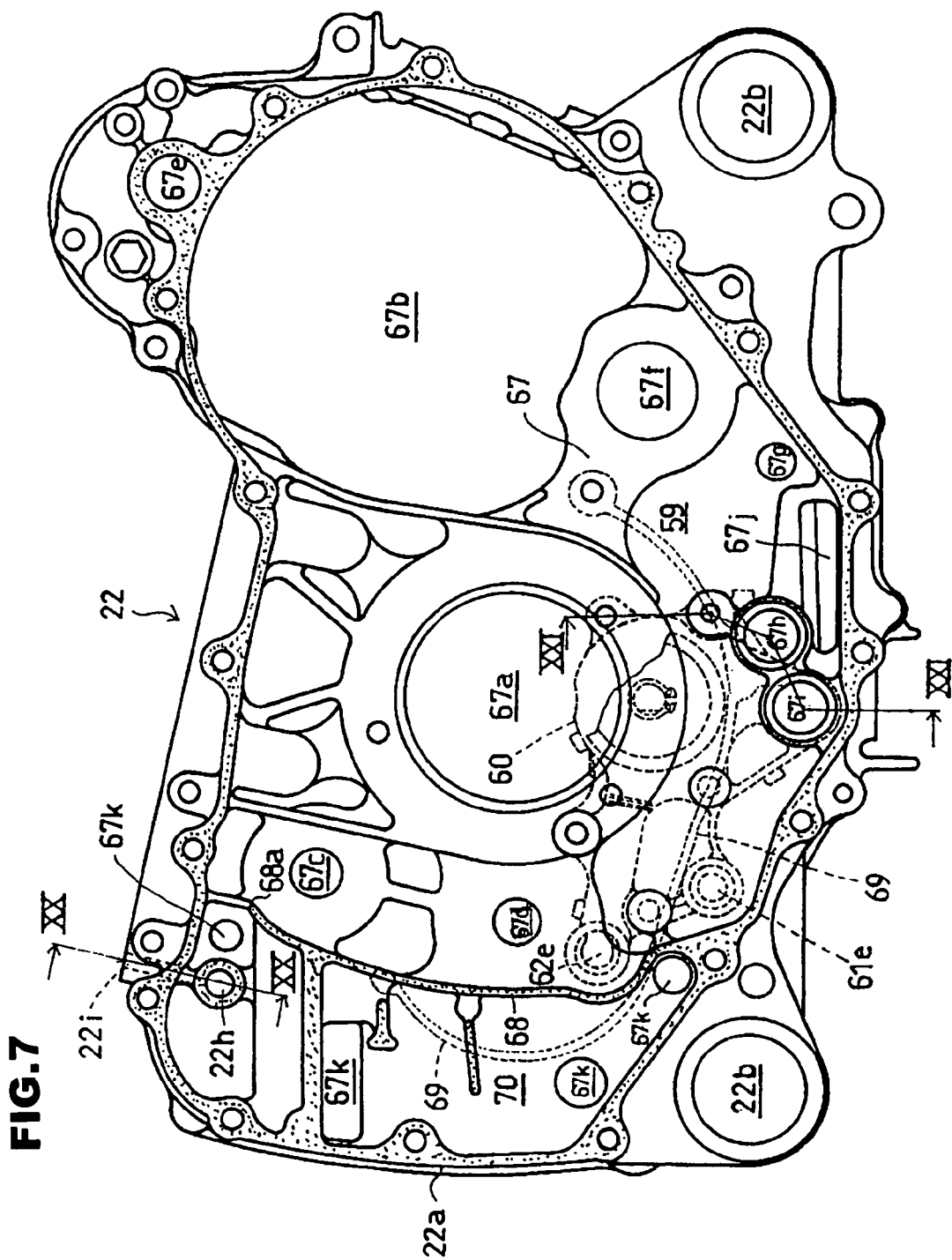
FIG. 7 is a front view of a front crankcase of the present invention.
Figure 32:
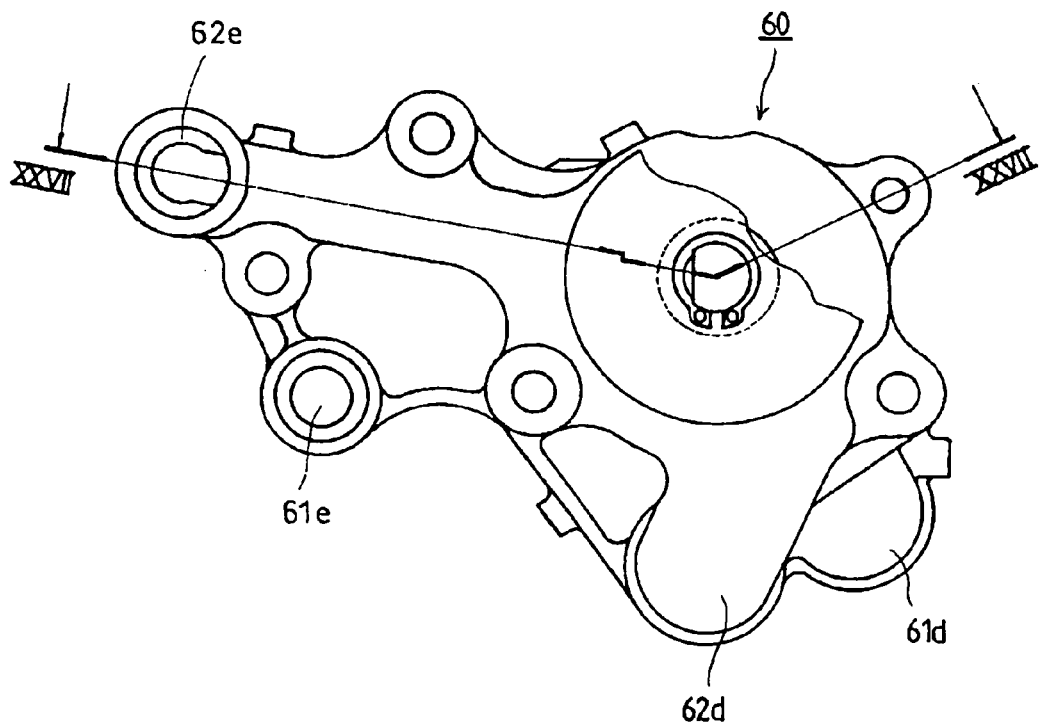
FIG. 32 is a front view of a lubricating oil pump of the present invention.
Figure 33:
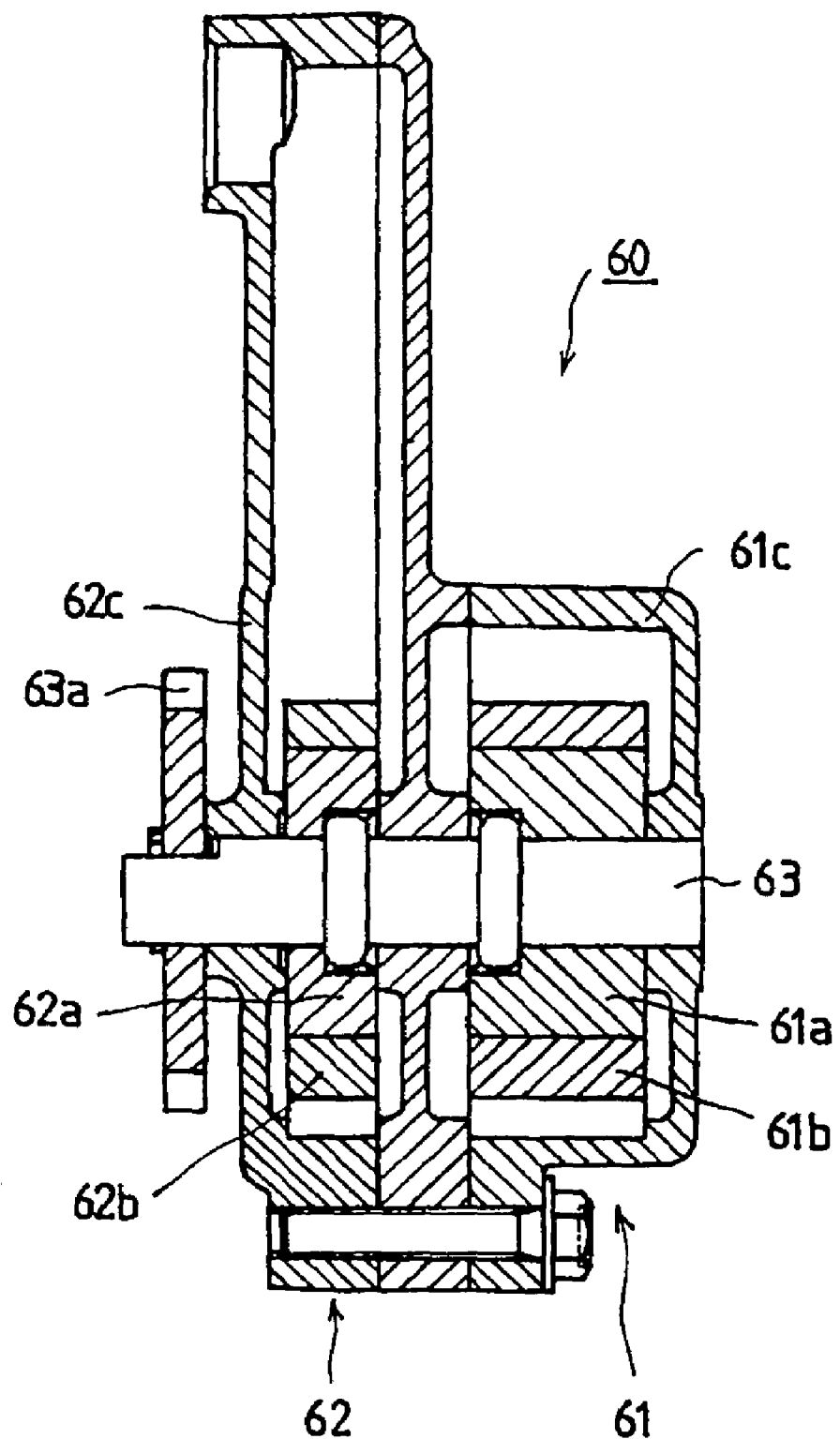
FIG. 33 is a sectional view taken along line XXXIII—XXXIII of FIG. 32.

As shown in FIGS. 6 and 7, which are views as viewed rearwards from the front side of the front case cover 21 and the front crankcase 22, and in FIG. 4, which is a sectional view taken along a vertical plane in the front-rear direction, the lubricating oil pump 60 is integrally attached to the front case cover 21 and the front crankcase 22 so that the front and rear surfaces of the lubricating oil pump 60 make close contact with the rear surface of the front case cover 21 and the front surface of the front crankcase 22, respectively. As shown in the enlarged views of FIGS. 32 and 33, the lubricating oil pump 60 includes of a trochoid type recovery pump 61 and a supply pump 62 which are arranged on the same pump rotary shaft 63. The recovery pump 61 and the supply pump 62 include inner rotors 61*a*, 62*a* mounted to the pump rotary shaft 63, outer rotors 61*b*, 62*b* meshed with the inner rotors 61*a*, 62*a*, and pump bodies 61*c*, 62*c* rotatably enclosing the outer rotors 61*b*, 62*b*, respectively. The outer rotors 61*b*, 62*b* are eccentric relative to the inner rotors 61*a*, 62*a*, and the numbers of teeth of the outer rotors 6 1*b*, 62*b* are greater than the numbers of teeth of the inner rotors 61*a*, 62*a* by one.

As shown in FIG. 4, a pump gear 63*a* integrally attached to the pump rotary shaft 63 of the lubricating oil pump 60 is meshed with a pump drive gear 56 integral with the crankshaft 28. Attendant on the rotation of the crankshaft 28, the pump rotary shaft 63 is driven to rotate, whereby in the recovery pump 61 the lubricating oil is sucked in through a suction port 61*d* and discharged through a discharge port 61*e*, and in the supply pump 62 the lubricating oil is sucked in through a suction port 62*d* and discharged through a discharge port 62*e*.

Crankcase

The specific structures of the front case cover 21, the front crankcase 22, the rear crankcase 23 and the rear case cover 24 constituting the crankcase of the 4-stroke-cycle internal combustion engine 20 will be described.

As shown in FIGS. 4 and 6, the front case cover 21 is provided integrally with a filter case 65 of the oil filter 64, and a filter element 66 (see FIG. 4) is contained in the filter case 65. The lubricating oil flowing into the filter case 65 through an inflow passage 65*a* at an outer circumferential portion of the filter case 65 is filtered by the filter element 66, and is then discharged into a central oil passage 65*b*.

Figure 8:
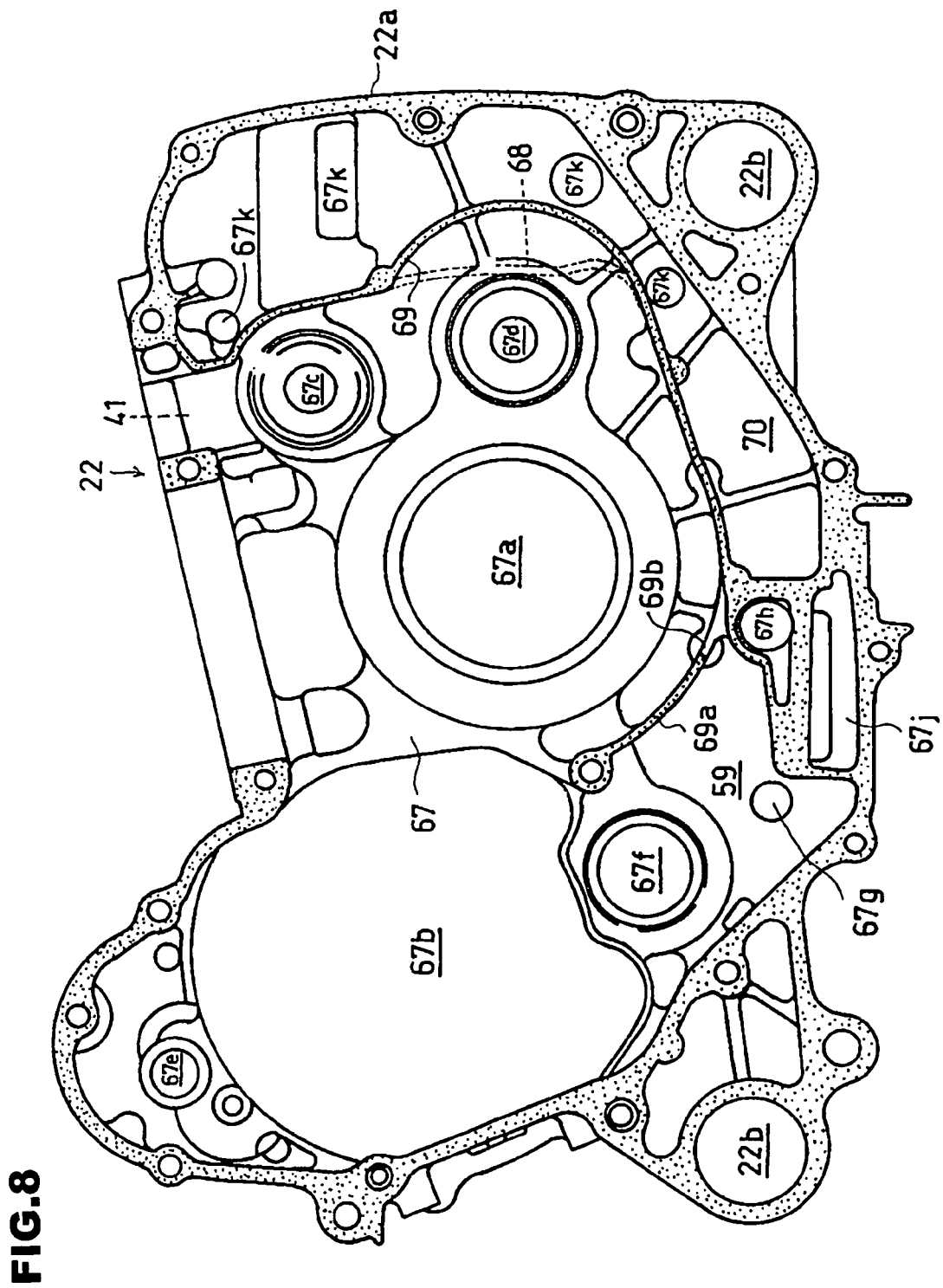
FIG. 8 is a rear view of the front crankcase of the present invention.

In addition, as shown in FIGS. 7 and 8, the front crankcase 22 is provided integrally with a partition wall 67 parallel to the front and rear faying surfaces of the front crankcase 22, substantially at the center in the front-rear and width directions. The partition wall 67 is provided with the following. A crankshaft hole 67*a* for passing the crankcase 28 therethrough. A transmission loose-fitting hole 67*b* for loose fitting therein of the static oil hydraulic type non-stage transmission 100 at a position on the left side in the crankcase. A camshaft hole 67*c* for passing and supporting the camshaft 43 therein. A balancer shaft hole 67*d* for passing and supporting the balancer shaft 53 therein at a position on the lower side of the camshaft hole 67*c*. A speed change drive shaft hole 67*e* for passing the speed change drive shaft 151 of the speed change drive shaft controller 150 therethrough and an output shaft hole 67f for passing and supporting the output shaft 163 therein, at positions on the upper and lower sides of the transmission loose fitting hole 67b. A crank chamber communication hole 67g and a recovery pump suction communication hole 67h in communication with the suction port 61d of the recovery pump 61, which are located on the lower side of the counter shaft hole 67f. A supply pump suction communication hole 67i in communication with the suction port 62d of the supply pump 62, and a strainer lower lubricating oil sump 67j ranging leftwards from the position directly below the recovery pump suction communication hole 67h.

Further, as shown in FIG. 7, in the front crankcase 22, a tank partition wall 68 projected forwards beyond the partition wall 67 is provided at a required spacing along a right side wall 22a (on the left side in FIG. 7) of the front crankcase 22. As shown in FIG. 8, a tank partition wall 69 projected rearwards beyond the partition wall 67 is provided at a position different from that of the tank partition wall 68 but substantially along the tank partition wall 68. A crank chamber 59 and an oil tank chamber 70 are partitioned by the tank partition wall 68 and the tank partition wall 69, and the partition wall 67 is provided with tank communication holes 67k (at four locations) at positions on the right outer side of the tank partition wall 68 and the tank partition wall 69 (the partition wall 67 is provided with only these holes).

Furthermore, as shown in FIG. 8, the tank partition wall 69 projected rearwards beyond the partition wall 67 is provided with a cutout 69b in an extension portion 69a extended to the right upper side at a slant (left upper side at a slant in FIG. 8) of the portion partitioning the crank chamber 59 and the oil tank chamber 70 so that the lubricating oil dwelling on the upper surface of the tank partition wall 69 flows downwards through the cutout 69b to be led to the strainer lower lubricating oil sump 67j.

The front crankcase 22 is provided with mount holes 22b in both lower side portions thereof. Rod-like members (not shown) penetrating through the mount holes 22b and mount holes 23b formed in both lower side portions of the rear crankcase 23 are integrally mounted to the vehicle body frame 2 through rubber bushes (not shown).

Figure 9:
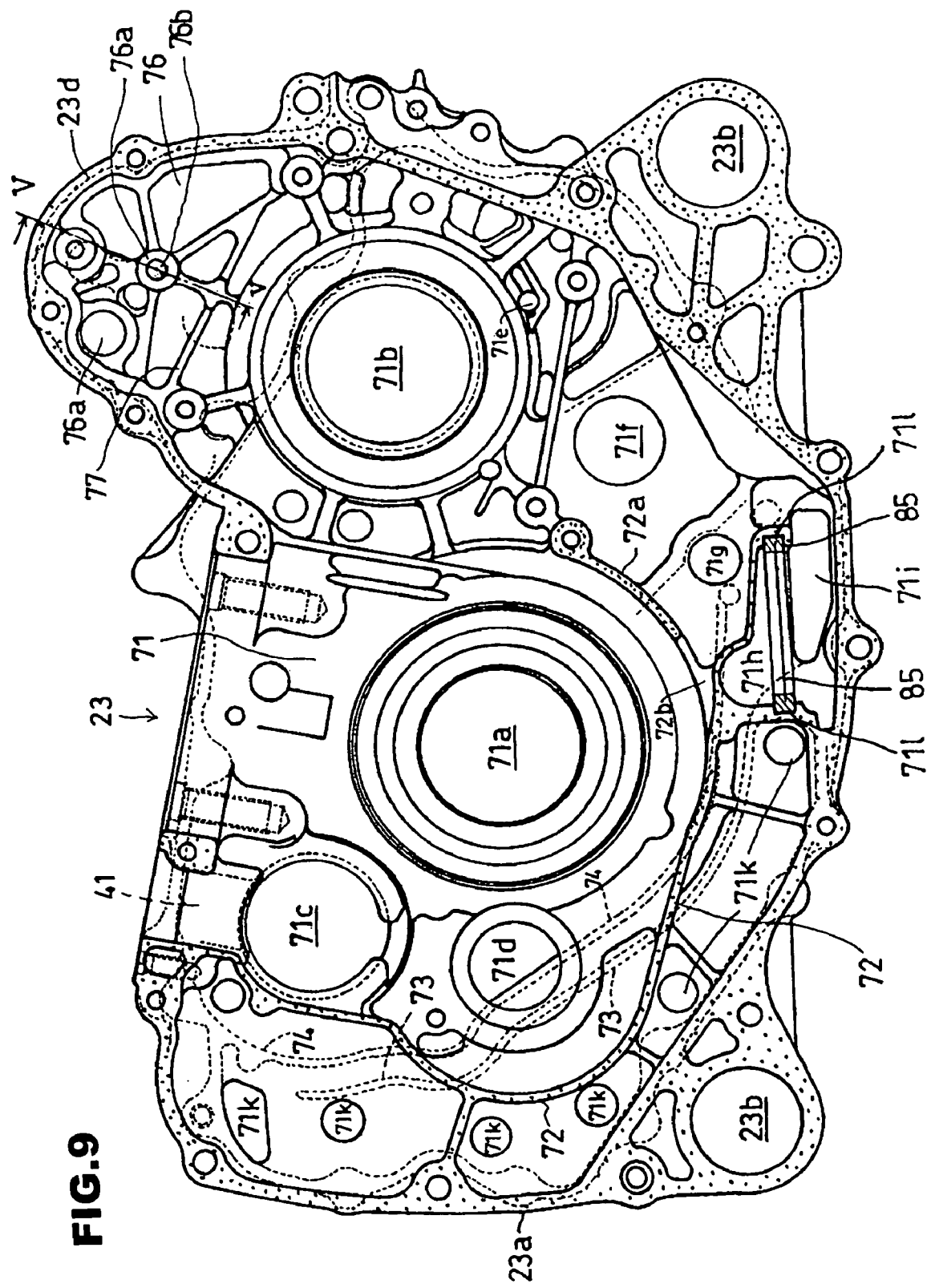
FIG. 9 is a front view of a rear crankcase of the present invention.
Figure 10:
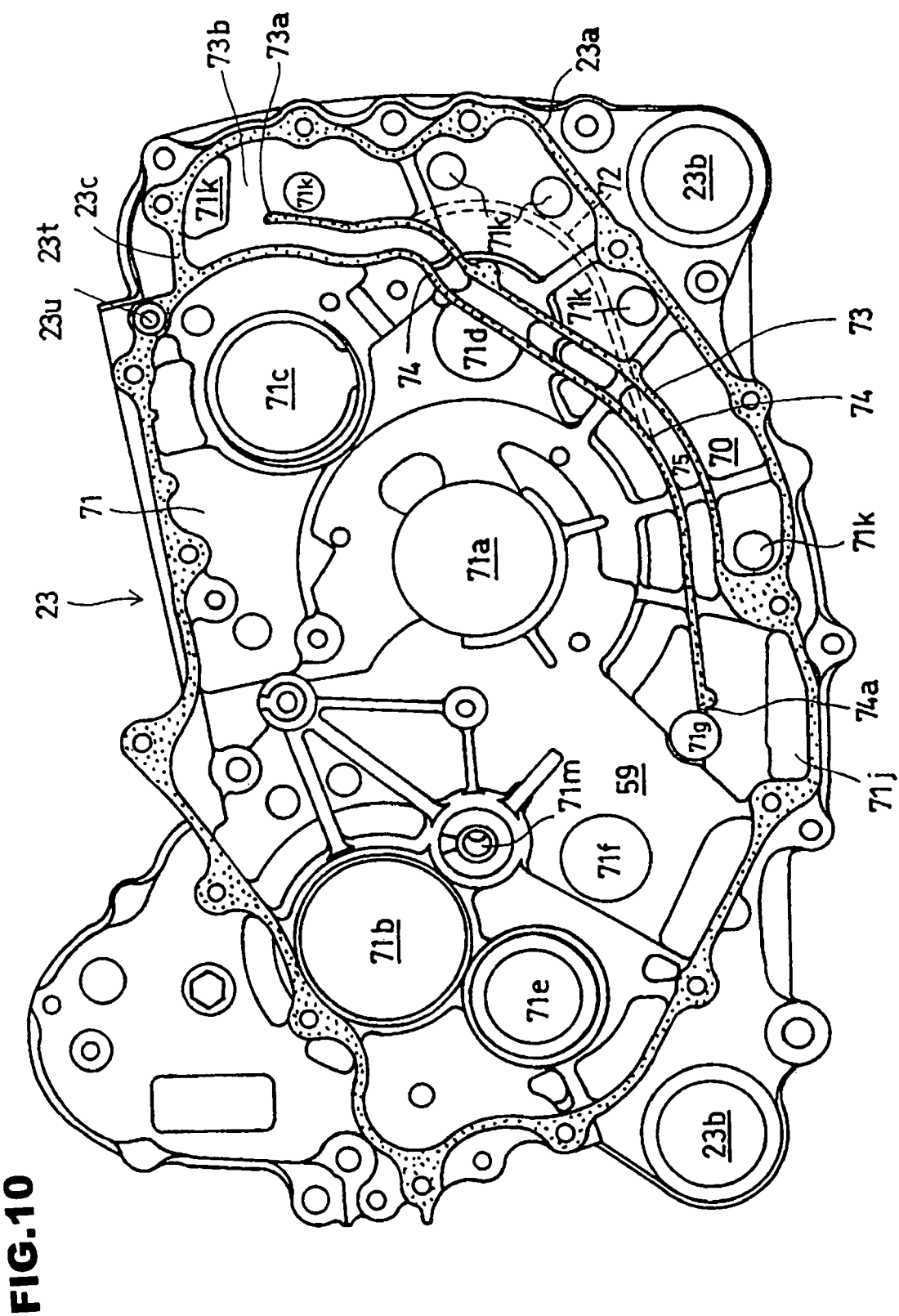
FIG. 10 is a rear view of the rear crankcase of the present invention.

In addition, as shown in FIGS. 9 and 10, like the front crankcase 22, the rear crankcase 23 is integrally provided with a partition wall 71 parallel to the front and rear faying surfaces of the rear crankcase 23, at the center in the front-rear and width directions thereof. The partition wall 71 is provided with the following. A crankshaft hole 71a for passing the crankshaft 28 therethrough. An oil hydraulic motor-rotary shaft hole 71b for rotatably bearing the oil hydraulic motor rotary shaft 131 of the swash plate type oil hydraulic motor 130 in the static oil hydraulic type nonstage transmission 100. A camshaft hole 71c for passing and supporting the camshaft 43 therein. A balancer shaft hole 71d for passing and supporting the balancer shaft 53 therein at a position on the lower side of the camshaft hole 71c. A counter shaft hole 71e for passing and supporting the counter shaft 162 therein at a position intermediate between the main shaft 161 and the output shaft 163 and on the left side. An output shaft hole 71f for passing and supporting the output shaft 163 therein at a position on the lower side of the oil hydraulic motor rotary shaft hole 71b. A crank chamber communication hole 71g at a position on the slanted right lower side of the output shaft hole 71f. A reverse shaft hole 71m (shown in FIG. 10 only) for supporting the reverse shaft 164 at a position intermediate between the main shaft 161 and the output shaft 163 and on the right side.

As shown in FIG. 9, the rear crankcase 23 is provided with a strainer lower lubricating oil sump 71j in communication with the strainer lower lubricating oil sump 67j of the crankcase 22, and is provided with a communication portion 71h in communication with the recovery pump suction communication hole 67h at a position on the upper side of the strainer lower lubricating oil sump 71j. A strainer 85 is fitted in both side cutouts 71l between the strainer lower lubricating oil sump 71j and the communication portion 71h.

Further, as shown in FIG. 9, the rear crankcase 23 is provided with a tank partition wall 72 (the tip end surface of the tank partition wall 72 can make contact with the rear end surface of the tank partition wall 69 of the front crankcase 22) projected forwards beyond the partition wall 71 at a required spacing along a right side wall 23a (on the left side in FIG. 9) of the rear crankcase 23, and, as shown in FIG. 10, the rear crankcase 23 is provided with a tank partition wall 73 projected rearwards beyond the partition wall 71 at a position different from the tank partition wall 72 but substantially along the tank partition wall 72 so that the crank chamber 59 and the oil tank chamber 70 are partitioned by the tank partition wall 72 and 73. The partition wall 71 is provided with tank communication holes 71k (at six locations) at positions on the right outer side of the tank partition wall 72 and the tank partition wall 73. As shown in FIG. 10, an upper end portion 73a of the tank partition wall 73 and a top wall portion 23c of the rear crankcase 23 are not connected to each other but are separated from each other, so that a gap 73b is formed between the upper end portion 73a of the tank partition wall 73 and the top wall portion 23c of the rear crankcase 23.

As shown in FIG. 9, the tank partition wall 72 projected forwards beyond the partition wall 71 is provided with a cutout 72b in its extension portion 72a curvedly extended to the right upper side at a slant so that the lubricating oil dwelling on the upper surface of the tank partition wall 72 flows downwards through the cutout 72b to be led to the strainer lower lubricating oil sump 71j.

Furthermore, as shown in FIG. 10, at a rear portion of the rear crankcase 23, an overflow oil passage wall 74 projected rearwards from the rear surface of the partition wall 71 is extended downwards from the top wall portion 23c of the rear crankcase 23 so that a required spacing is present at a position on the upper left side of the tank partition wall 73. The lower front end 74a of the overflow oil passage wall 74 is extended to the crank chamber communication hole 71g of the partition wall 71, and an overflow oil passage 75 is constituted of the tank partition wall 73 and the overflow oil passage wall 74.

Figure 25:
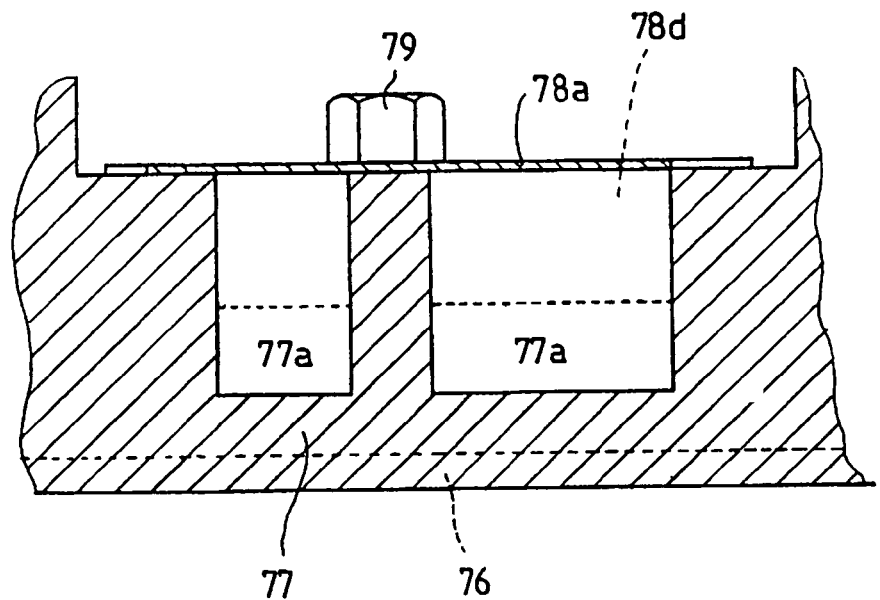
FIG. 25 is a sectional view taken along line XXV—XXV of FIG. 22.

As shown in FIGS. 3 and 5, a breather chamber 80 is disposed on the center axis of the speed change drive shaft 151 of the speed change drive shaft controller 150. As shown in FIGS. 5, 9, 23 and 25, the partition wall 71 is not present at a left upper portion (a right upper portion in FIG. 9) of the rear crankcase 23 corresponding to the breather chamber 80, and a breather chamber bottom wall 76 flush with the rear faying surface of the rear crankcase 23 is provided there. A breather partition portion 77 for partitioning the breather chamber 80 is projected forwards from the breather chamber bottom wall 76, and the breather partition portion 77 is provided with a cutout portion 77a as shown in FIG. 25.

Figure 23:
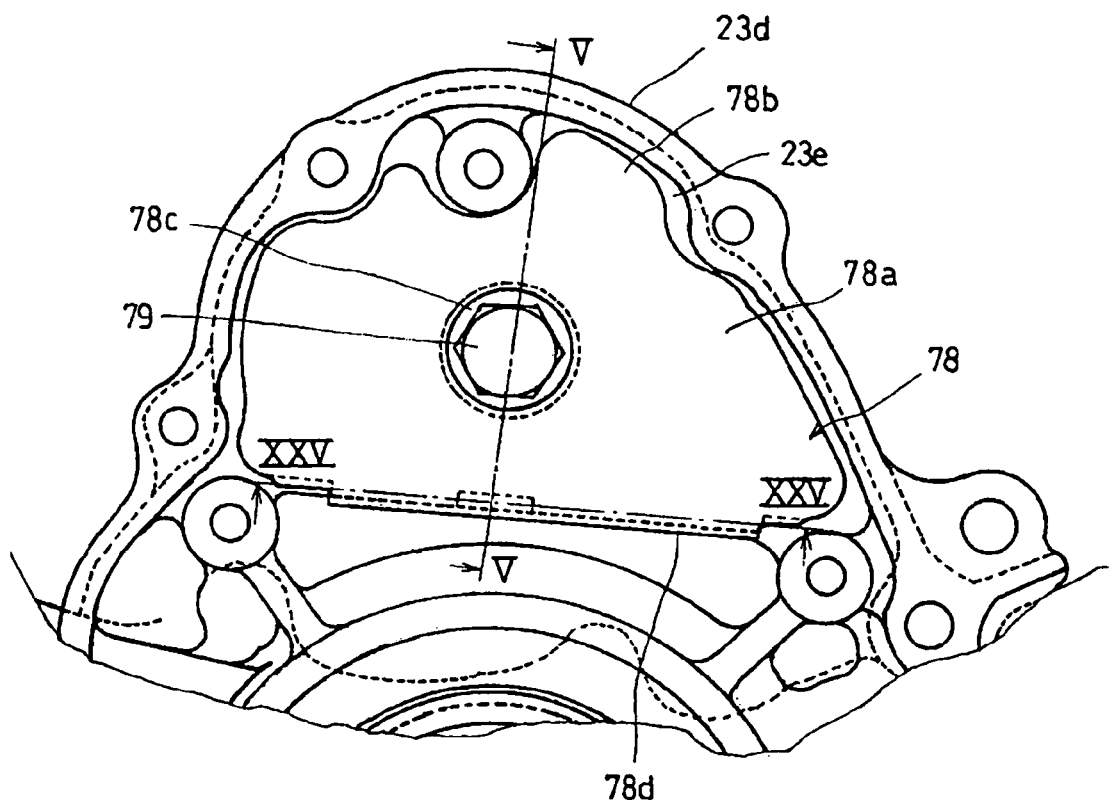
FIG. 23 is a sectional view taken along line XXIII—XXIII of FIG. 10.

In addition, a shaft support portion 76a projected forwards from a substantially central portion of the breather chamber bottom wall 76 is provided with a threaded hole 76b. An outer circumferential edge portion 78b of a top wall 78a of a breather cover 78, L-shaped in section as shown in FIG. 5, is brought into contact with an inner circumferential step portion 23e of a left top wall 23d of the rear crankcase 23, as shown in FIG. 23. A bolt 79 penetrating through a hole formed at a central recessed portion 78c of the top wall 78a of the breather cover 78 is screwed into the threaded hole 76b in the shaft support portion 76a so that the breather chamber 80 is constituted of the left top wall 23d of the rear crankcase 23, the breather chamber bottom wall 76, the breather partition portion 77 and a bent wall 78d of the breather cover 78.

Further, the breather chamber bottom wall 76 is provided with an opening 76b. As shown in FIG. 5, one end of a breather pipe 81 is fitted in the opening 76b, and the other end of the breather pipe 81 is connected to an intake system of the 4-stroke-cycle internal combustion engine 20 through a pipe, a hose and the like which are not shown.

Figure 11:
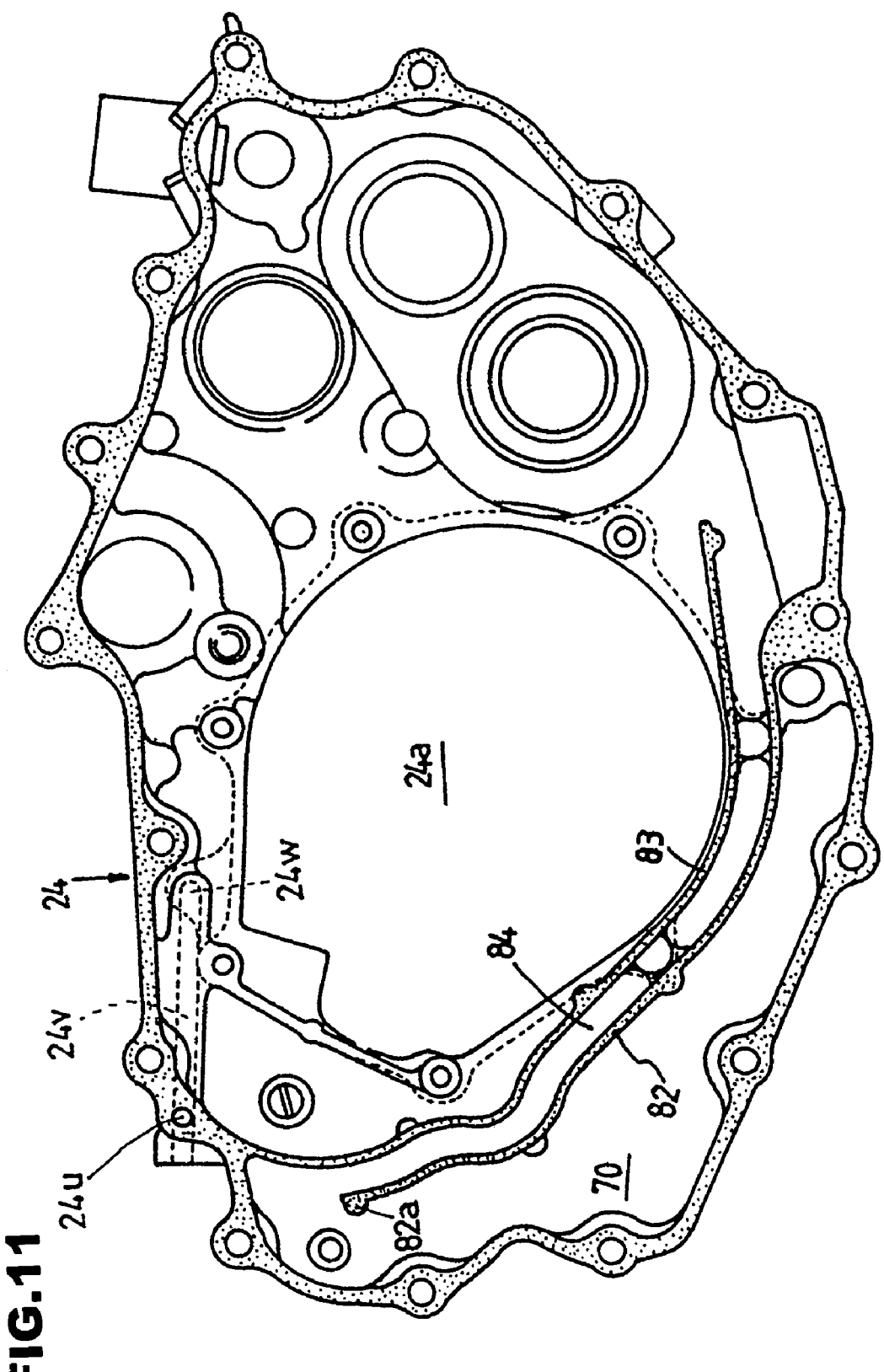
FIG. 11 is a front view of a rear case cover of the present invention.

Furthermore, a tank partition wall 82 and an overflow oil passage wall 83 (shown in FIG. 11) whose tip end surfaces can make contact with the rear end surfaces of the tank partition wall 73 and the overflow oil passage wall 74 projected rearwards beyond the partition wall 71 of the rear crankcase 23 (shown in FIG. 10) are projected forwards at the front surface of the rear case cover 24, as shown in FIG. 11.

Figure 12:
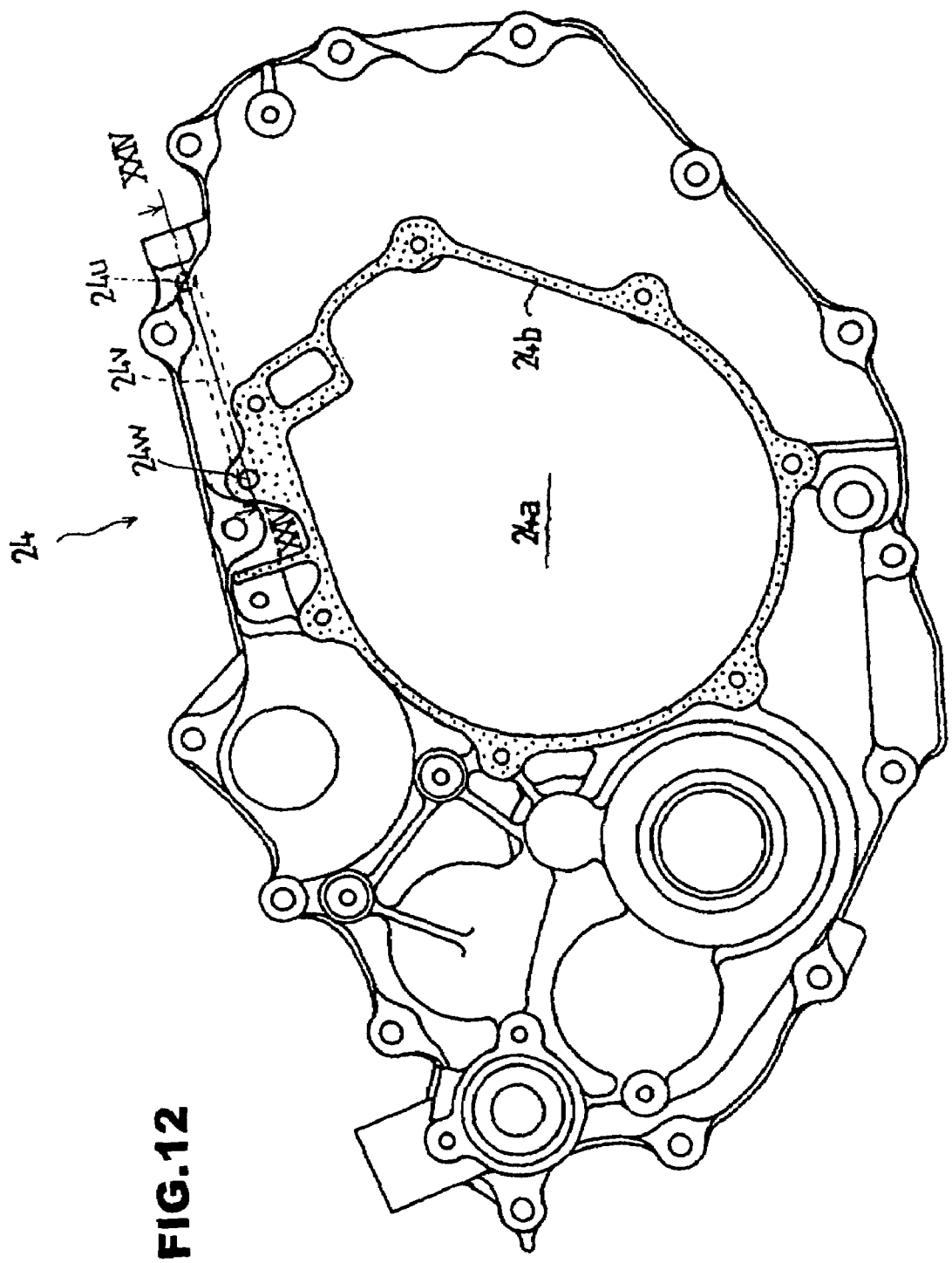
FIG. 12 is a rear view of the rear case cover of the present invention.

The rear case cover 24 is provided with an opening 24a in which the ACG 54 can be fitted, and, as shown in FIG. 12, a contact portion 24b with which the casing 54b of the ACG 54 can make contact is formed at an outer circumferential rear surface of the opening 24a.

Cylinder Block, Cylinder Head

Figure 13:
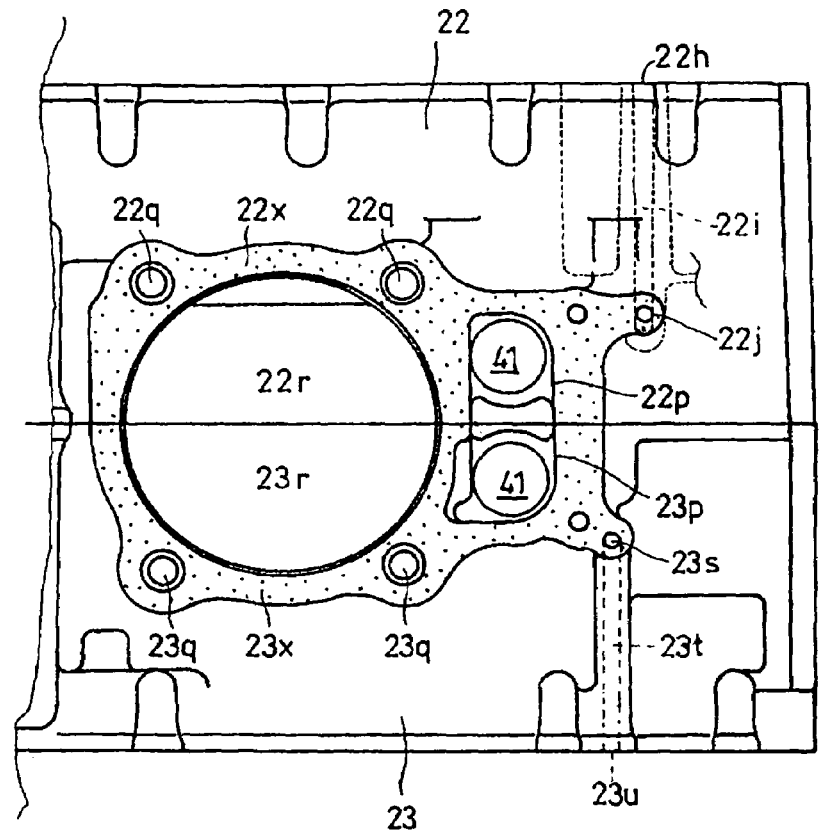
FIG. 13 is a plan view of the front crankcase and the rear crankcase of the present invention.

FIG. 13 is a plan view in which the rear surface of the front crankcase 22 and the front surface of the rear crankcase 23 are laid on each other. Under the condition where an opening 25p of the communication hole 40 in the cylinder block 25 shown in FIG. 26 coincides with openings 22p and 23p formed in the front crankcase 22 and the rear crankcase 23. A cylinder bottom portion faying surface 25x of the cylinder block 25 is laid on cylinder block faying surfaces 22x and 23x of the front crankcase 22 and the rear crankcase 23. Cylinder sleeve insertion holes 22r and 23r are composed of semi-circular cutouts in the top walls of the front crankcase 22 and the rear crankcase 23, and a cylinder sleeve 25r (see FIG. 4) of the cylinder block 25 is fitted in the cylinder sleeve insertion holes 22r and 23r.

Figure 29:
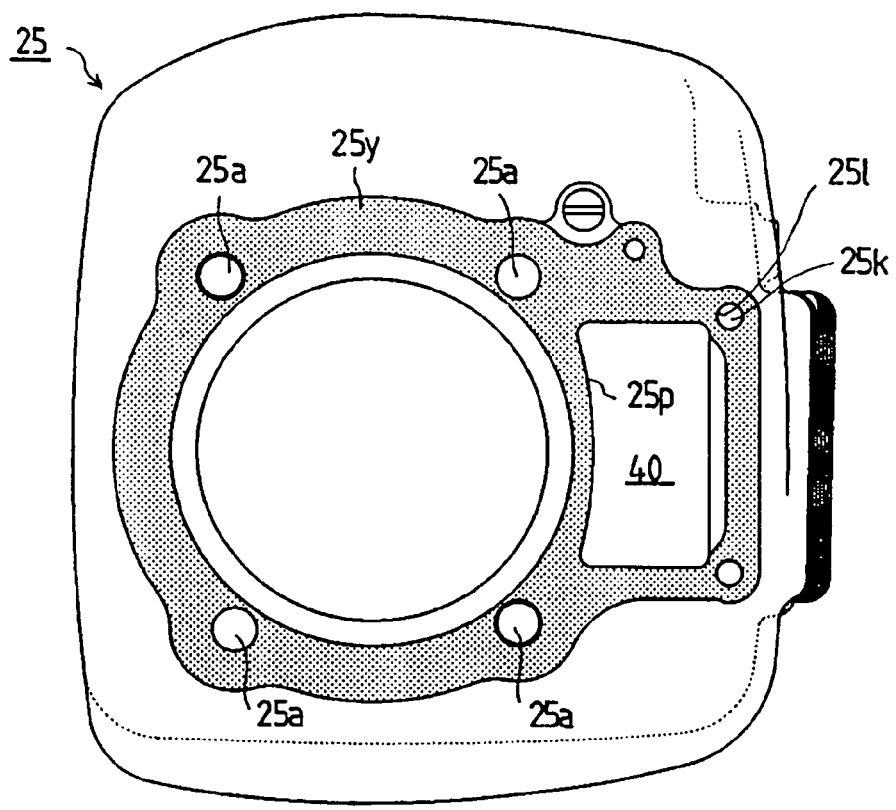
FIG. 29 is a top view of the cylinder block of the present invention.

In addition, FIG. 29 is a top view of the cylinder block 25. Under the condition where an opening 26p of the communication hole 40 in the cylinder head 26 shown in FIG. 30 coincides with the opening 25p of the communication hole 40 in the cylinder block 25, a cylinder head bottom portion faying surface 26y of the cylinder head 26 is laid on a cylinder head faying surface 25y of the cylinder block 25, and lower end screws of four bolts (not shown) penetrating through bolt holes 26a and 25a formed in the cylinder head 26 and the cylinder block 25 are screwed into bolt holes 22q and 23q respectively formed in the front crank case 22 and the rear crankcase 23, whereby the cylinder block 25, the cylinder head 26, the front crankcase 22 and the rear crankcase 23 are mutually integrally connected.

Further, as shown in FIG. 3, the outer circumferential surface of the head cover 27 is brought into contact with the top surface of the cylinder head 26, and the head cover 27 is integrally connected to the cylinder head 26 by bolts or the like, which are not shown.

Lubricating Oil Circuit

Figure 34:
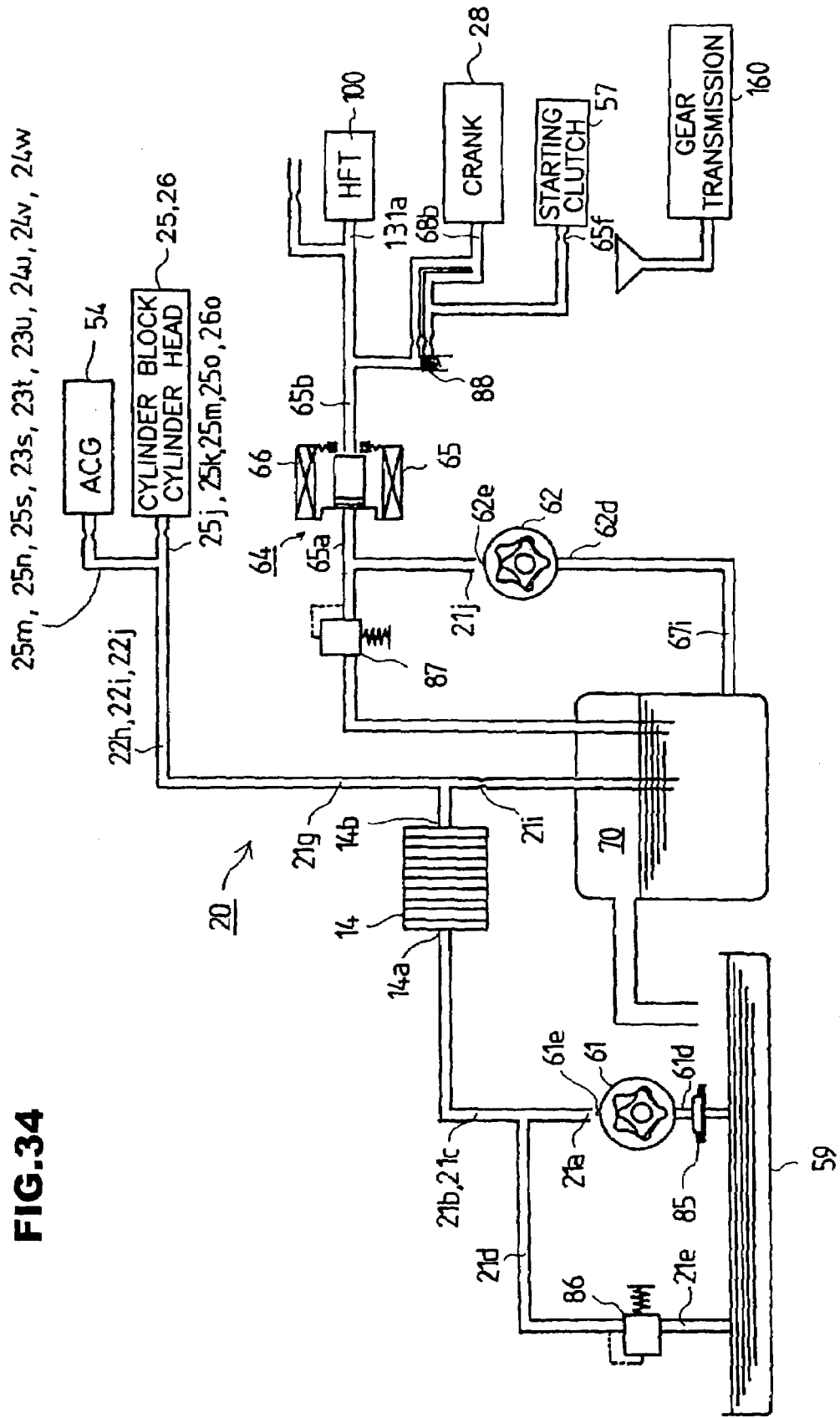
FIG. 34 is an illustration of the outline of a lubricating oil circuit according to the present invention.

Referring to FIG. 34, in this embodiment, the outline of a lubricating oil circuit through which the lubricating oil in the 4-stroke-cycle internal combustion engine 20 is supplied to individual portions of the power unit 1 will be described. The suction port 61d of the recovery pump 61 is connected to the crank chamber 59 through the strainer 85, the discharge port 61e of the recovery pump 61 is connected to a suction port 14a of the oil cooler 14, and a discharge port 14b of the oil cooler 14 is connected to the ACG 54, the cylinder block 25 and the cylinder head 26 and is connected to the oil tank chamber 70.

The suction port 62d of the supply pump 62 is connected to a bottom portion of the oil tank chamber 70, the discharge port 62e of the supply pump 62 is connected to the suction port 65a of the oil filter 64, and the discharge port 65b of the oil filter 64 is connected to the static oil hydraulic type non-stage transmission 100, the 4-stroke-cycle internal combustion engine 20 and the starting clutch 57.

Further, the discharge ports 61e and 62e of the recovery pump 61 and the supply pump 62 are connected to the crank chamber 59 and the oil tank chamber 70 through relief valves 86 and 87, respectively.

Next, the crank chamber 59 and the oil tank chamber 70, integrally constituted inside the front case cover 21, the front crankcase 22, the rear crankcase 23 and the rear case cover 24, are partitioned by the partition wall 67 of the front crankcase 22 into front and rear portions. In the front portion, the crank chamber 59 and the oil tank chamber 70 are partitioned into left and right portions by the tank partition wall 68 of the front crankcase 22 (shown in FIG. 7) and a tank partition wall 89 formed of the front case cover 21 correspondingly to the tank partition wall 68. In a central portion in the front-rear direction intermediately bound between the partition wall 67 of the front crankcase 22 and the partition wall 71 of the rear crankcase 23, the crank chamber 59 and the oil tank chamber 70 are partitioned into left and right portions by the tank partition wall 69 of the front crankcase 22 (shown in FIG. 8) and the tank partition wall 72 of the rear crankcase 23 (shown in FIG. 9). The crank chamber 59 and the oil tank chamber 70 are partitioned by the partition wall 71 of the rear crankcase 23 into front and rear portions. At the rear portion, the crank chamber 59 and the oil tank chamber 70 are partitioned into left and right portions by the tank partition wall 73 (shown in FIG. 10) and the tank partition wall 82 (shown in FIG. 11).

In addition, as shown in FIGS. 7 and 8, the crank chamber 59 at the front portion and the crank chamber 59 at the central portion in the front-rear direction are mutually communicated through the crank chamber communication hole 67g formed in the partition wall 67 of the front crankcase 22 and the strainer lower lubricating oil sump 67j. As shown in FIGS. 9 and 10, the crank chamber 59 at the central portion in the front-rear direction and the crank chamber 59 at the rear portion are mutually communicated through the crank chamber communication hole 71g formed in the partition wall 71 of the rear crankcase 23 and the strainer lower lubricating oil sump 71j.

Further, as shown in FIGS. 7 and 8, the oil tank chamber 70 at the front portion and the oil tank chamber 70 at the central portion in the front-rear direction are mutually communicated through the tank communication holes 67k (at four locations) formed in the partition wall 67 of the front crankcase 22. As shown in FIGS. 9 and 10, the oil tank chamber 70 at the central portion in the front-rear direction and the oil tank chamber 70 at the rear portion are mutually communicated through the tank communication holes 71k (at six locations) formed in the partition wall 71 of the rear crankcase 23.

Oil passages formed inside the front case cover 21, the front crankcase 22, the rear crankcase 23, the rear case cover 24, the cylinder block 25 and the cylinder head 26 will be described specifically, according to the lubricating oil circuit shown in FIG. 34.

As shown in FIGS. 6 and 7, the suction port 61d of the recovery pump 61 is connected to the recovery pump suction communication hole 67h of the front crankcase 22. When the rotary shaft 63 of the lubricating oil pump 60 is driven to rotate, the lubricating oil dwelling in the strainer lower lubricating oil sumps 67j and 71j is filtered through the strainer 85 as shown in FIG. 9, and then flows through the communication portion 71h of the rear crankcase 23 and the recovery pump suction communication hole 67h of the front crankcase 22 into the suction port 61d of the recovery pump 61.

Figure 14:
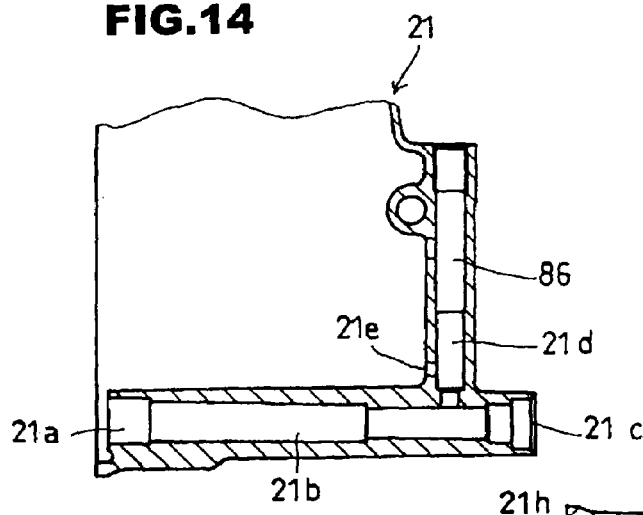
FIG. 14 is a sectional view taken along line XIV—XIV of FIG. 6.

In addition, as shown in FIGS. 6 and 14, the discharge port 61e of the recovery pump 61 is connected to an opening 21a on the rear side of the front case cover 21, the opening portion 21a is in communication with a front end opening 21c through a communication passage 21b directed forwards, and the opening 21c and the inflow port 14a of the oil cooler 14 are connected to each other through a hose, a pipe and the like, which are not shown, so that the lubricating oil discharged from the discharge port 61e of the recovery pump 61 is fed to the oil cooler 14. As shown in FIG. 14, the branch passage 21d is branched from the communication passage 21b, and a relief valve 86 is interposed in the branch passage 21d. When the lubricating oil pressure in the communication passage 21b reaches or exceeds a predetermined setpoint pressure, the relief valve 86 operates so that the lubricating oil is returned from the branch passage 21d into the crank chamber 59 through an opening 21e.

Figure 15:
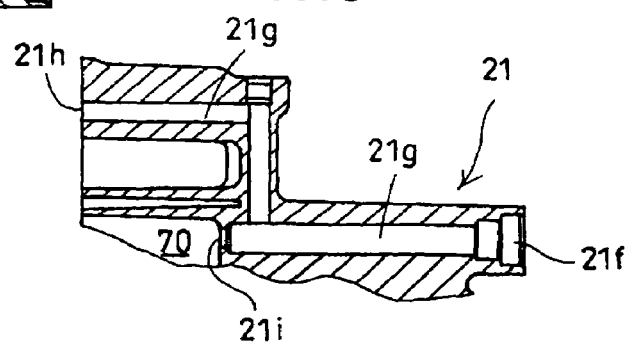
FIG. 15 is a sectional view taken along line XV—XV of FIG. 6.

Further, the discharge port 14b of the oil cooler 14 is connected to a return port 21f of the front case cover 21 shown in FIG. 6 through a hose, a pipe and the like, which are not shown. As shown in FIG. 15, the return port 21f is in communication with an opening 21h through a communication passage 21g, and to the oil tank chamber 70 through an orifice 21i.

Figure 20:
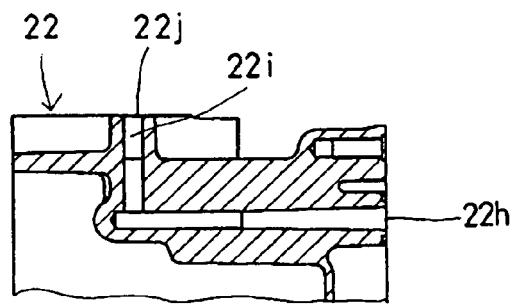
FIG. 20 is a sectional view taken along line XX—XX of FIG. 7.
Figure 21:
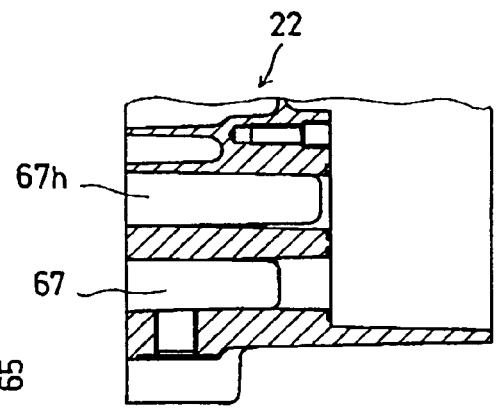
FIG. 21 is a sectional view taken along line XXI—XXI of FIG. 7.

Furthermore, as shown in FIGS. 6 and 7, the opening 21h of the front case cover 21 and an opening 22h of the front crankcase 22 coincide with each other, and, as shown in FIG. 20, the opening 22h is in communication with an opening 22j through a communication passage 22i.

Figure 26:
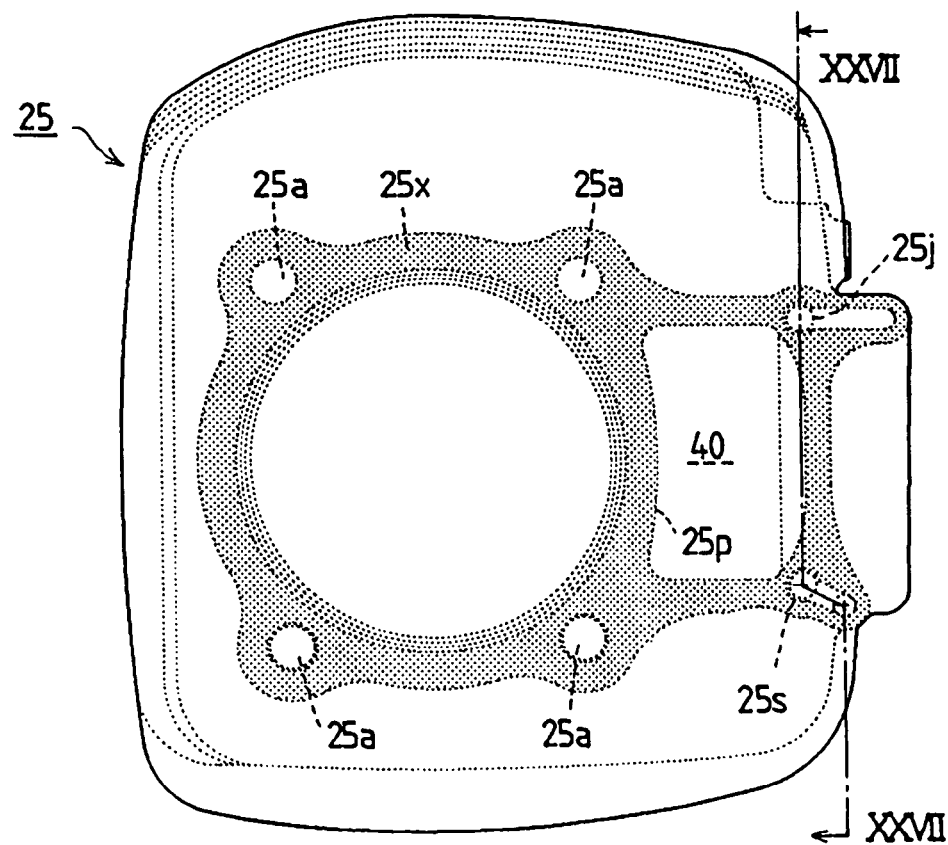
FIG. 26 is a plan view, as viewed from above, of the shape of the bottom surface of a cylinder block of the present invention.
Figure 27:
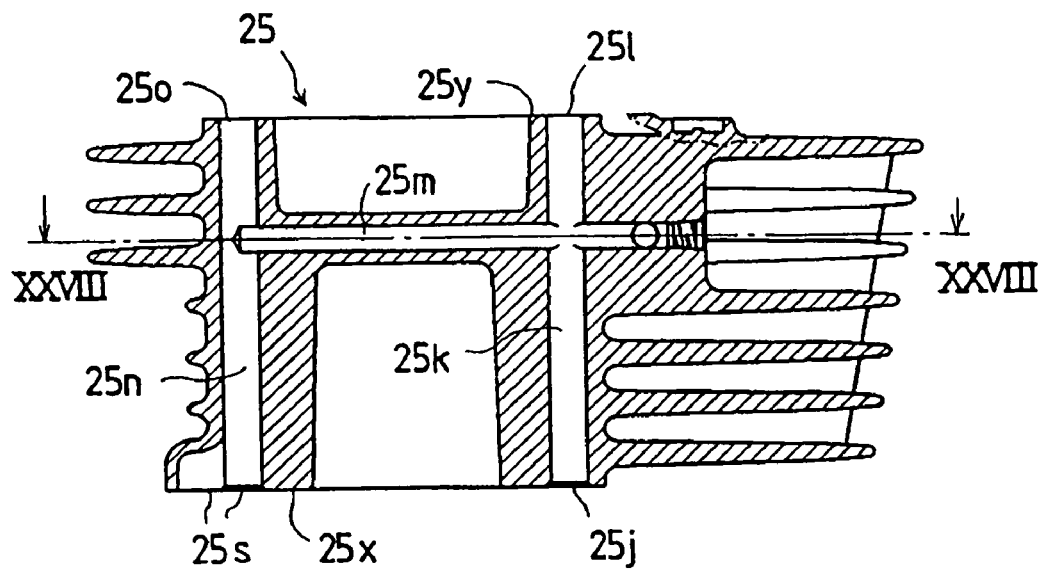
FIG. 27 is a sectional view taken along line XXVII—XXVII of FIG. 26.
Figure 28:
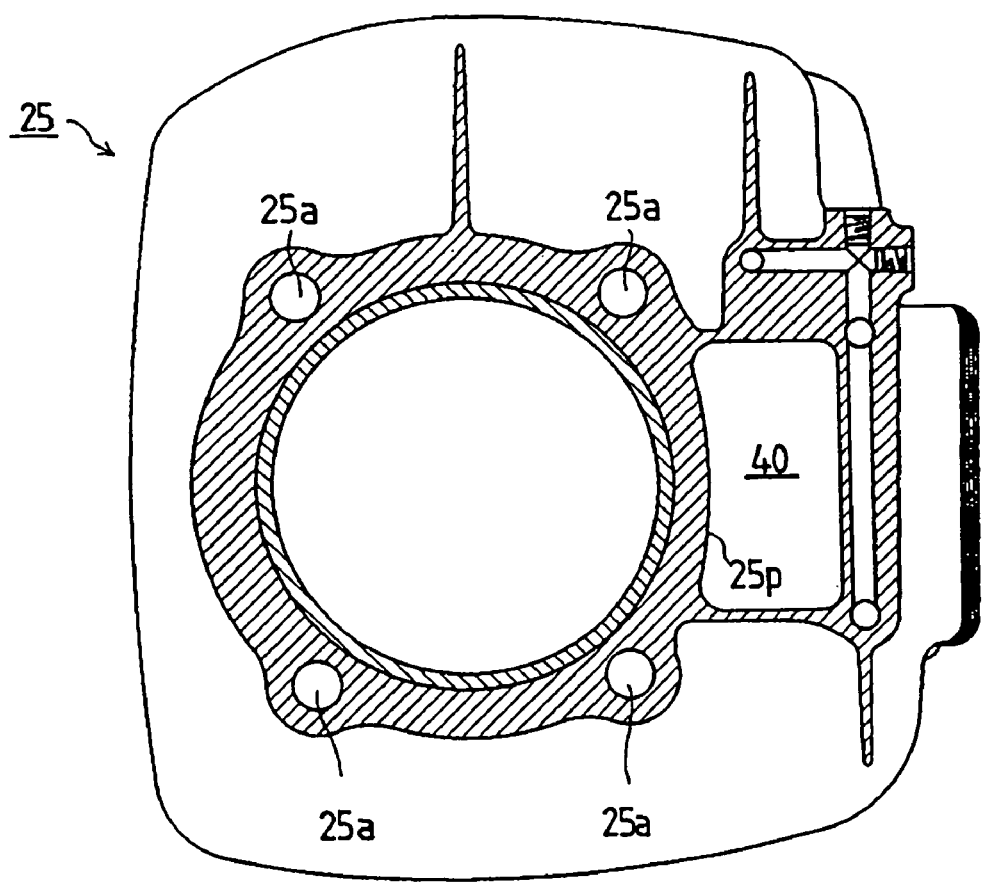
FIG. 28 is a sectional view taken along line XXVIII—XXVIII of FIG. 27.
Figure 30:
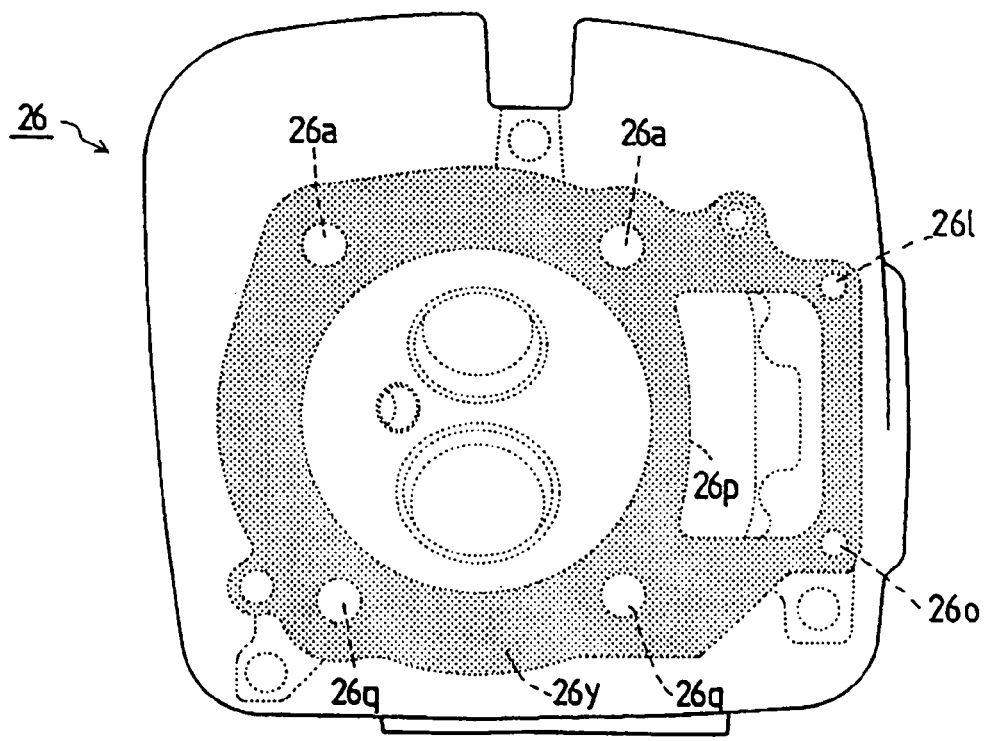
FIG. 30 is a plan view, as viewed from above, of the shape of the bottom surface of a cylinder head of the present invention.

As shown in FIG. 13, the opening 22j opened in the cylinder block faying surface 22x of the front crankcase 22 coincides with an opening 25j opened in the cylinder bottom portion faying surface 25x of the cylinder block 25 shown in FIG. 26. As shown in FIG. 27, the opening 25j is in communication with an opening 25l in the cylinder head faying surface 25y of the cylinder block 25 through a vertical communication passage 25k. As shown in FIGS. 29 and 30, the opening 25l in the cylinder block 25 coincides with a communication passage 26l in the cylinder head 26, and the upper end of the communication passage 26l is exposed into the space surrounded by the head cover 27.

As shown in FIGS. 26 and 27, the vertical communication passage 25k and a vertical communication passage 25n parallel thereto are mutually communicated through a communication passage 25m extending in the front-rear direction, the upper end opening 25o of the vertical communication passage 25n coincides with an opening 26o in the cylinder head 26, and the upper end of the opening 26o is also exposed to the spacing surrounded by the head cover 27.

Figure 22:
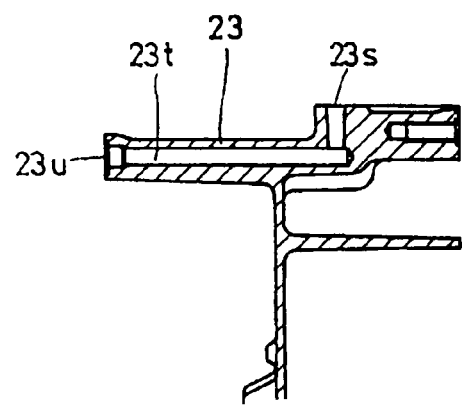
FIG. 22 is an enlarged view of a part of FIG. 9.
Figure 24:
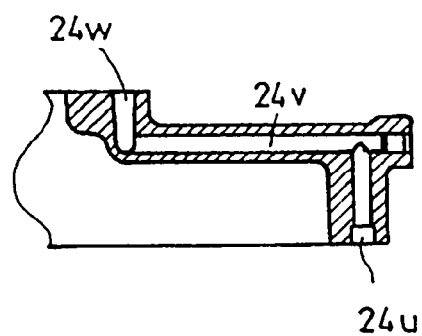
FIG. 24 is a sectional view taken along line XXIV—XXIV of FIG. 12.

Further, the lower end opening 25s of the vertical communication passage 25n in the cylinder block 25 shown in FIG. 27 is in communication with an opening 23s in the rear crankcase 23 shown in FIG. 13. As shown in FIG. 22, the opening 23s is in communication with an opening 23u through a communication passage 23t, and the opening 23u in the rear crankcase 23 is in communication with an opening 24u in the rear case cover 24 shown in FIG. 11. As shown in FIG. 24, the opening 24u is in communication with an opening 24w through a communication passage 24v, and the opening 24w in the rear case cover 24 is in communication with an ACG lubricating oil jet port (not shown) provided in a cover 54b (see FIG. 4) of the ACG 54.

As has been described above, the lubricating oil fed to the oil cooler 14 by the recovery pump 61 and cooled by the oil cooler 14 is fed to the return port 21f in the front case cover 21 shown in FIG. 15, is passed through the communication passage 21g, is jetted into the oil tank chamber 70 through the orifice 21i, and is allowed to dwell in the oil tank chamber 70. The lubricating oil dwelling in the oil tank chamber 70 is sucked into the suction port 62d of the supply pump 62 through the supply pump suction communication hole 67i opened into the oil tank chamber 70, and the pressure lubricating oil pressurized by the supply pump 62 is fed through the discharge port 62e of the supply pump 62 to a discharge port 21j in the front case cover 21, as shown in FIG. 16.

Figure 16:
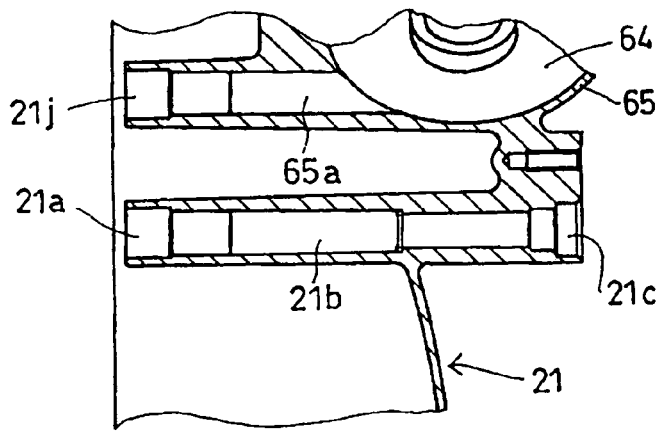
FIG. 16 is a sectional view taken along line XVI—XVI of FIG. 6.
Figure 19:
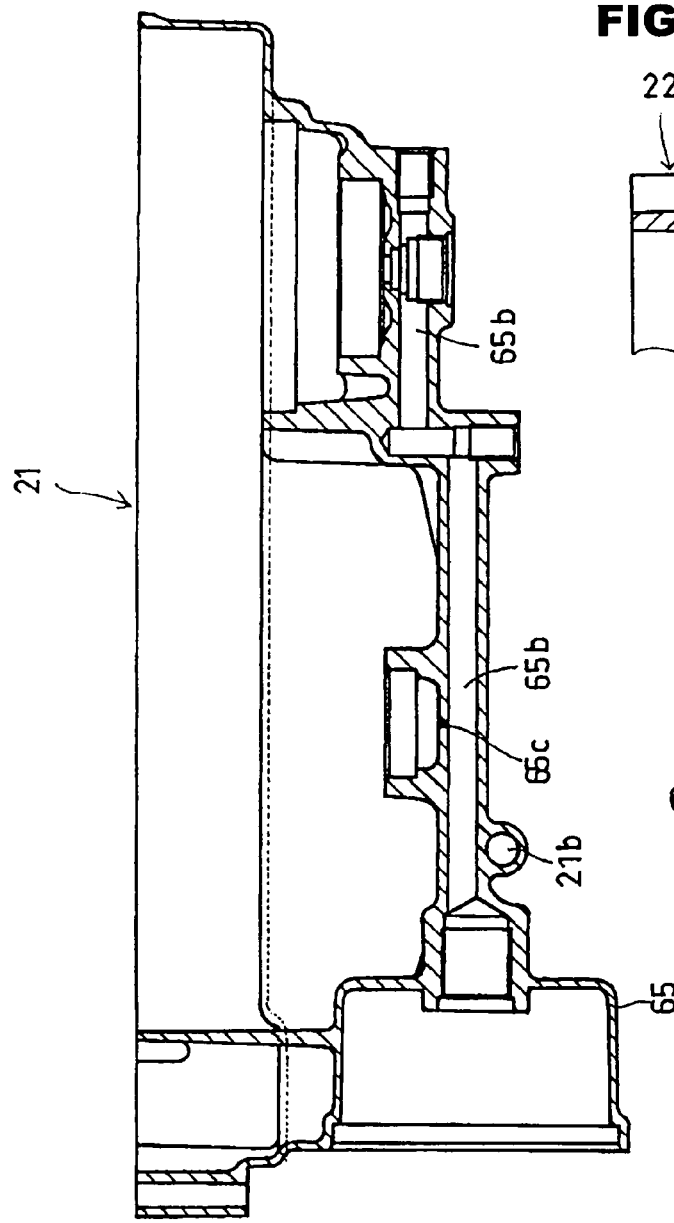
FIG. 19 is a sectional view taken along line XIX—XIX of FIG. 6.

The discharge port 21j in the front case cover 21 shown in FIG. 16 is connected to the inflow passage 65a in the filter case 65 of the oil filter 64. As shown in FIGS. 4 and 19, the discharge passage 65b in the filter case 65 is connected to a center hole 131a in the oil hydraulic motor rotary shaft 131 of the static oil hydraulic type non-stage transmission 100, and is connected to a center hole 68b in the crankshaft 28 through an orifice 65c shown in FIGS. 4 and 19. As shown in FIG. 4, the center hole 68b is in communication with a clutch communication hole 68c. Thus, the cooled lubricating oil filtered by the oil filter 64 is supplied to the static oil hydraulic type non-stage transmission 100 and the crankshaft 28.

Figure 17:
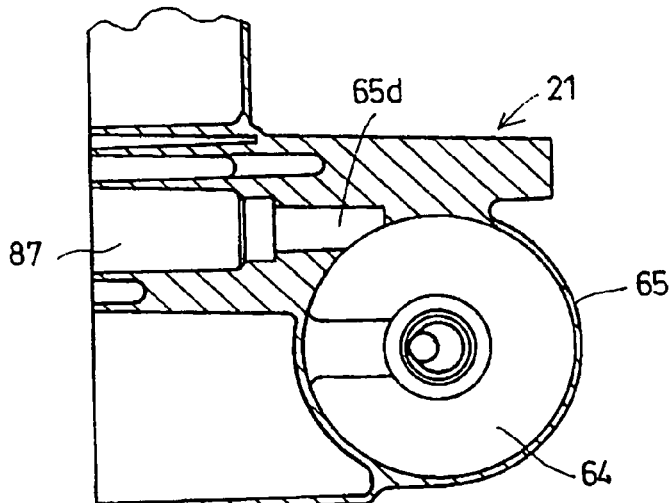
FIG. 17 is a sectional view taken along line XVII—XVII of FIG. 6.
Figure 18:
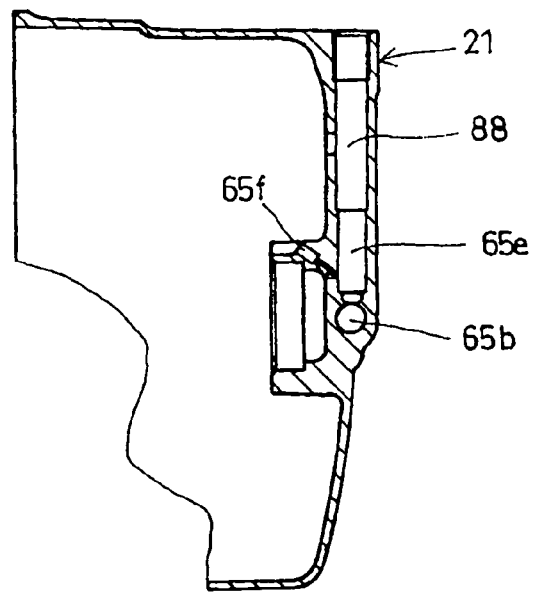
FIG. 18 is a sectional view taken along line XVIII—XVIII of FIG. 6.

In addition, as shown in FIG. 17, in the front case cover 21, a relief valve 87 is interposed in a communication passage 65d between the communication between a filter chamber in the filter case 65 and the crank chamber 59 (the left side in the figure). As shown in FIG. 18, a branch passage 65e is branched from a discharge passage 65b in the filter case 65, a check valve 88 is interposed in the branch passage 65e, and a lubricating oil jet port 65f is formed from the branch passage 65e toward the starting clutch 57 in the crank chamber 59. When the pressure inside the filter chamber in the filter case 65 exceeds a predetermined value, the lubricating oil is ejected into the crank chamber 59 through the relief valve 87. In addition, when the lubricating oil pressure inside the discharge passage 65b in the filter case 65 exceeds a predetermined value, the lubricating oil is ejected into the crank chamber 59 through the check valve 88. Further, the lubricating oil in the discharge passage 65b in the filter case 65 is jetted through the lubricating oil jet port 65f toward the starting clutch 57.

Since the embodiment shown in the drawings is constituted as described above, when the 4-stroke-cycle internal combustion engine 20 is started by operating the recoil starter 55 in the condition where the counter gear 166 and the counter shaft 162 are connected to each other by moving the shifter 167 forwards, the 4-stroke-cycle internal combustion engine 20 is put into an operating condition. When the rotational frequency of the crankshaft 28 exceeds a predetermined rotational frequency, the starting clutch 57 is put into a connected condition, and the pump casing 111 of the static oil hydraulic type non-stage transmission 100 is driven to rotate.

The oil hydraulic motor rotary shaft 131 is driven to rotate at a required speed change ratio according to the magnitude of the inclination angle of the motor swash plate 133 of the swash plate type oil hydraulic motor 130 set correspondingly to the axial position of the drive member 152 in the speed change drive shaft controller 150, the speed of the counter shaft 162 is reduced at a predetermined speed change ratio at the gear transmission 160, and the power is transmitted from the output shaft 163 to the front Wheels 3 and the rear wheels 4 through the front and rear transmission shafts 5 and through the front axle 6 and the rear axle 7, whereby the four-wheel vehicle 0 can be moved forwards.

In addition, as shown in FIG. 3, the angle a between the plane connecting the swash plate type oil hydraulic pump 110 of the static oil hydraulic type non-stage transmission 100, the oil hydraulic motor rotary shaft 131 on the center line of the swash plate type oil hydraulic motor 130 and the speed change drive shaft 151 of the speed change drive shaft controller 150 and the center line of the cylinder bore 29 is as small as about 10°. Besides, on the left side of the 4-stroke-cycle internal combustion engine 20, the static oil hydraulic type non-stage transmission 100 and the speed change drive shaft controller 150 are disposed close to the 4-stroke-cycle internal combustion engine 20. Therefore, the size in the width direction of the power unit for vehicle with internal combustion engine 1 is small, providing a compact design, which improves the mountability of the power unit on the four-wheel vehicle 0.

Further, since the speed change ratio sensor 102 is disposed on the left outer side of the static oil hydraulic type non-stage transmission 100, the maintenance, inspection and repair of the speed change ratio sensor 102 can be easily carried out from the left side of the four-wheel vehicle 0.

Furthermore, the breather chamber 80 is located on the left upper side of the crank chamber 59 and disposed on the extension line of the speed change drive shaft 151 of the speed change drive shaft controller 150, and the static oil hydraulic type non-stage transmission 100 is disposed on the lower side thereof. Therefore, the lubricating oil droplets scattered from the crankshaft 28 and the main gear 165, counter gear 166, shifter 167, counter output gear 168 and gear 169 of the gear transmission 160 are shielded by the static oil hydraulic type non-stage transmission 100, thereby being inhibited from reaching the left upper side of the crank chamber 59, and a blow-by gas with a low oil mist mixing ratio is introduced into the breather chamber 80. As a result, the breather chamber 80 may be small in capacity, and can be simplified in structure.

Moreover, since the crankshaft 28 is directed in the front-rear direction of the vehicle body, the ACG 54, the recoil starter 55, the starting clutch 57 and the gear transmission 160 are arranged in the front-rear direction of the vehicle body, which, in cooperation with the arrangement of the static oil hydraulic type non-stage transmission 100 and the speed change drive shaft controller 150 close to the center axis of the cylinder bore 29, promises a further reduction of the size of the power unit 1 and a further enhancement of the mountability thereof on the four-wheel vehicle 0.

In addition, as shown in FIG. 3, the static oil hydraulic type non-stage transmission 100 is disposed on the left side in the space inside the crankcase composed of the front case cover 21, the front crankcase 22, the rear crankcase 23 and the rear case cover 24, and the oil tank chamber 70 is disposed on the right side in the space inside the crankcase. Therefore, it is easy to obtain weight balance between the left and right sides of the power unit 1 by utilizing the weight of the static oil hydraulic type non-stage transmission 100 and the weight of the lubricating oil in the oil tank chamber 70.

Further, as shown in FIG. 6, the tank partition wall 89 is integrally projected from the inside wall surface of the front case cover 21. As shown in FIGS. 7 and 8, the tank partition wall 68 and the tank partition wall 69 are integrally projected forwards and rearwards from the partition wall 67 of the front crankcase 22. As shown in FIGS. 9 and 10, the tank partition wall 72 and the tank partition wall 73 are integrally projected forwards and rearwards from the partition wall 71 of the rear crankcase 23. As shown in FIG. 11, the tank partition wall 82 is integrally projected rearwards from the inside wall surface of the rear case cover 24. Therefore, there is no need for special component parts for constituting the oil tank chamber 70, the weight and the number of working steps are reduced, and the crankcase can be reduced in weight and cost and enhanced in rigidity.

Furthermore, the oil tank chamber 70 is formed between the front crankcase 22 and the rear crankcase 23 by the tank partition wall 69 (see FIG. 8) projected rearwards from the partition wall 67 of the front crankcase 22 and the tank partition wall 72 (see FIG. 9) projected forwards from the partition wall 71 of the rear crankcase 23. The oil tank chamber 70 is formed between the front case cover 21 and the front crankcase 22 by the tank partition wall 89 (see FIG. 6) projected rearwards from the inside wall surface of the front case cover 21 and the tank partition wall 68 (see FIG. 7) projected forwards from the partition wall 67 of the front crankcase 22. The oil tank chamber 70 is formed between the rear crankcase 23 and the rear case cover 24 by the tank partition wall 73 (see FIG. 10) projected rearwards from the partition wall 71 of the rear crankcase 23 and the tank partition wall 82 (see FIG. 11) projected forwards from the inside wall surface of the rear case cover 24. Therefore, the capacity of the oil tank chamber 70 is extremely large.

Moreover, since the front case cover 21, the front crankcase 22, the rear crankcase 23 and the rear cover case 24 can be die-cast or cast, a further enhancement of productivity and a further reduction in cost can be achieved.

In addition, the recovery pump 61 by which the lubricating oil dwelling in the strainer lower lubricating oil sumps 67*j* and 71*j* at bottom portions inside the crankcase is fed to the oil tank chamber 70 and the supply pump 62 by which the lubricating oil is supplied from the oil tank chamber 70 to the crankshaft 28 and the starting clutch 57 of the 4-stroke-cycle internal combustion engine 20 and the static oil hydraulic non-stage transmission 100 are arranged coaxially. Therefore, the overall size of the lubricating oil pump 60 composed of the recovery pump 61 and the supply pump 62 is reduced, and the lubricating oil pump 60 can be reduced in size and weight. Further, the oil passage between the recovery pump 61 and the supply pump 62 and the oil passage between the lubricating oil pump 60 and the oil tank chamber 70 are shortened, whereby the pump loss of the lubricating oil pump 60 is reduced.

Further, the filter case 65 of the oil filter 64 for filtering the lubricating oil to be supplied from the oil tank chamber 70 to the individual portions of the 4-stroke-cycle internal combustion engine 20 and the static oil hydraulic type non-stage transmission 100 is arranged at a position on the front side of the oil tank chamber 70 and overlapping with the oil tank chamber 70 as viewed in the front-rear direction of the vehicle body. Therefore, the oil tank chamber 70 and the oil filter 64 are arranged close to each other, and the lubricating oil in the oil filter 64 is immediately returned into the oil tank chamber 70 through the relief valve 87 interposed in the communication passage 65d of the oil filter 64, so that the pump loss of the supply pump 62 is low.

Furthermore, the oil filter 64 is located on the front side of the front case cover 21; therefore, as shown in FIG. 4, a cover 64a of the oil filter 64 can be easily removed on the front side of the four-wheel vehicle 0, replacement of the filter element 66 can be easily carried out, and the maintenance, inspection and repair of the oil filter 64 can be carried out quickly and easily.

In addition, as for the cylinder block 25, the cylinder head 26 and the ACG 54, which do not need a filtered lubricating oil but need a cooled lubricating oil, the lubricating oil cooled by passing through the oil cooler 14 is supplied directly to the cylinder block 25, the cylinder head 26 and the ACG 54 without passing through the oil filter 64. Therefore, the load on the supply pump 62 can be reduced, the power loss with respect to the supply pump 62 can be greatly reduced, and the supply pump 62 can be reduced in size.

Figure 31:
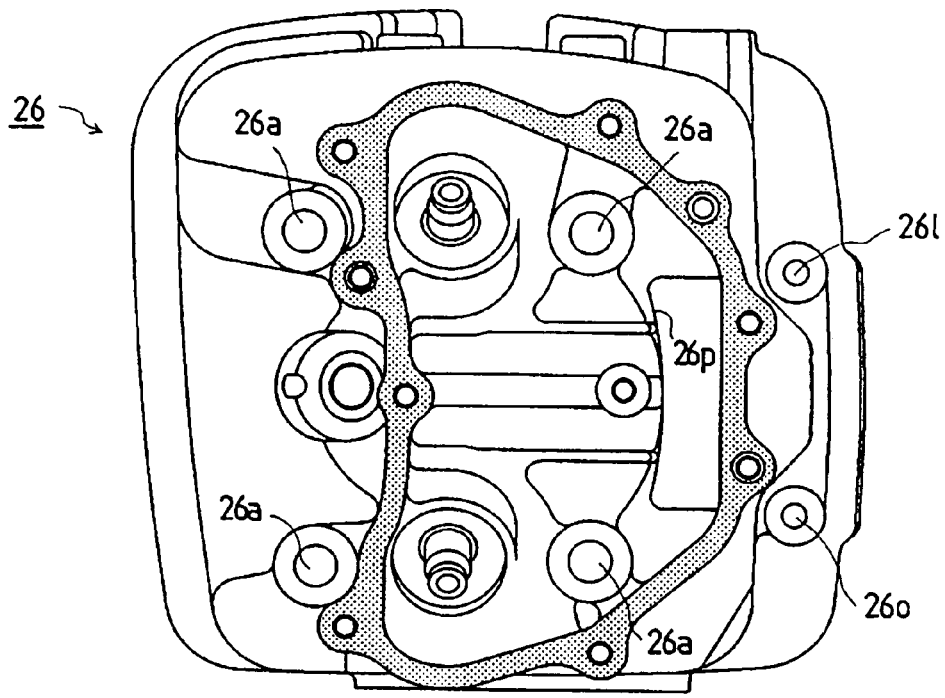
FIG. 31 is a top view of the cylinder head of the present invention.

As shown in FIG. 15, the lubricating oil fed to the oil cooler 14 by the recovery pump 61 and cooled by the oil cooler 14 flows through the return port 21f of the front case cover 21 and the communication passage 21g to reach the opening 21h, and is fed from the opening 22h of the front crankcase 22 shown in FIG. 20 to the opening 22j through the communication passage 22i. As shown in FIGS. 13, 26 and 27, the lubricating oil is fed from the opening 22j of the front crankcase 22 to the top surface opening 25l of the cylinder block 25 through the bottom surface opening 25j and the vertical communication passage 25k in the cylinder block 25. Further, as shown in FIGS. 29, 30 and 31, the lubricating oil reaches the top opening 26l of the cylinder head 26, flows out through the top surface opening 26l to the top surface of the cylinder head 26, and drops from the cylinder head 26 back into the crank chamber 59 through the communication hole 40, whereby the cylinder block 25 and the cylinder head 26 are cooled.

In addition, as shown in FIG. 27, the communication passage 25m is branched from the vertical communication passage 25k. Therefore, a part of the lubricating oil rising through the vertical communication passage 25k flows through the communication passage 25m to reach the vertical communication passage 25n, and the lubricating oil flowing in an upper portion of the vertical communication passage 25n flows out through the top surface opening 26o to the top surface of the cylinder head 26 in the same manner as the lubricating oil flowing through the top surface opening 26l, and drops through the communication hole 40 into the crank chamber 59, whereby the cylinder block 25 and the cylinder head 26 are cooled.

Further, the lubricating oil flowing in a lower portion of the vertical communication passage 25n flows through the bottom surface opening 25s of the cylinder block 25 to reach the opening 23s in the rear crankcase 23, is fed through the communication passage 23t shown in FIG. 22 to the opening 23u, is fed from the opening 23u through the opening 24u and the communication passage 24v in the rear case cover 24 shown in FIG. 24 to the opening 24w, and is jetted through the lubricating oil jet port of the ACG 54, whereby the ACG 54 is cooled.

Further, the cooled lubricating oil sucked up from the crank chamber 59 to be supplied to the oil cooler 14 by the recovery pump 61 and cooled by the oil cooler 14 is not supplied to the oil filter 64 but supplied directly to the cylinder block 25 and the cylinder head 26. Therefore, the cylinder block 25 and the cylinder head 26 are not only cooled by the air cooling, in which a cooling airflow blasted rearwards by the fan 13 and a running airflow caused by running the vehicle are brought into contact with the cooling fins 37 and the cooling fins 38, but also cooled by the lubricating oil cooling in which the cooled lubricating oil passes inside the cylinder block 25 and the cylinder head 26. As a result, the cylinder block 25 and the cylinder head 26, and hence the portion surrounding the combustion chamber 32, are cooled sufficiently.

Furthermore, the lubricating oil cooled by the oil cooler 14 is also supplied to the recoil starter 54 without passing through the oil tank chamber 70, so that the recoil starter 54 is also cooled sufficiently.

In addition, upper end edges 73a and 82a of the tank partition wall 73 projected rearwards from the partition wall 71 (shown in FIG. 10) and the tank partition wall 82 projected forwards from the inside wall surface (shown in FIG. 11) are located on the lower side of upper end edges 89a and 68a of the tank partition wall 89 projected rearwards from the inside wall surface of the front cover case 21 (shown in FIG. 6) and the tank partition wall 68 projected forwards from the partition wall 67 of the front crankcase 22 (shown in FIG. 7). Further, the partition wall 67 of the front crankcase 22 is provided with the tank communication hole 67k, and the partition wall 71 of the rear crankcase 23 is provided with the tank communication hole 71k. Therefore, the oil surfaces of the lubricating oil in the oil tank 70 are all maintained at the same level, and the lubricating oil in the oil tank chamber 70 can calmly flow into the overflow oil passage 75 and the overflow oil passage 84 via the upper end edges 73a and 82a of the tank partition wall 73 and the tank partition wall 82 which are low in height. As a result, the lubricating oil in the crank chamber 59 is prevented from being stirred by the crankshaft 28, whereby power loss and generation of mist of the lubricating oil are reduced. Also, the lubricating oil is led into the strainer lower lubricating oil sumps 67j and 71j at the bottom portions of the crank chamber 59 smoothly and calmly, whereby the generation of bubbles is also reduced.

Further, as shown in FIGS. 10 and 11, the overflow oil passages 75 and 84 are constituted of the tank partition wall 73, the tank partition wall 82 and overflow oil passage walls 74 and 83, which are formed integrally with the rear crankcase 23 and the rear case cover 24, respectively. Therefore, the overflow oil passages 75 and 84 are extremely simplified in structure, which reduces manufacturing costs.

Furthermore, the oil tank chamber 70 between the rear crankcase 23 and the rear case cover 24 is formed in a crescent shape along the right side wall 23a of the rear crankcase 23 (the right side wall of the rear case cover 24 is not denoted by any symbol). Therefore, the tank partition wall 73, the tank partition wall 82 and the overflow oil passage walls 74 and 83 are also formed in similar shapes, so that the lubricating oil having flowed over partition wall upper edges 73a and 82a of the oil tank chamber 70 is led to the strainer lower lubricating oil sumps 67j and 71j at the bottom portions of the crank chamber 59, without generating a turbulent flow.

The present invention should not be considered limited to the particular examples or materials described above, but rather should be understood to cover all aspect of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A power unit for a vehicle with an internal combustion engine, the power unit comprising:
    an internal engine having a cylinder block having a cylinder center axis directed substantially in the vertical direction and a crankshaft;
    a static oil hydraulic non-stage transmission for speed-changing the rotation from the crankshaft, the transmission including a awash plate oil hydraulic pump and a swash plate oil hydraulic motor disposed coaxially; and
    a speed change drive shaft for reciprocating a drive member for changing a swash plate angle of the swash plate oil hydraulic motor or the swash plate oil hydraulic pump,
    wherein the speed change drive shaft is disposed at a position on an upper side of the transmission and in parallel to an axis of the transmission, and a plane connecting an axis of the speed change drive shaft and the axis of the transmission does not intersect with an axis of the crankshaft, and intersects with the axis of the cylinder center axis of the cylinder block at a position on a lower side of the axis of the crankshaft while making an acute angle with the axis of the cylinder center axis of the cylinder block.

2. The power unit for a vehicle with an internal combustion engine as set forth in claim 1, the power unit further comprising:
    a speed change ratio sensor that detects a speed change ratio of the transmission disposed on a lateral side of the transmission at a substantially right angle to the axis of the transmission, in relation to the plane connecting the axis of the speed change drive shaft and the axis of the transmission.

3. The power unit for a vehicle with an internal combustion engine as set forth in claim 1, wherein a crankcase for bearing the crankshaft of the internal combustion engine incorporates the static oil hydraulic type non-stage transmission and the speed change drive shaft therein, and a breather chamber is disposed on or in the vicinity of an extended axis of the speed change drive shalt in the crankcase.

4. The power unit for a vehicle with an internal combustion engine as set forth in claim 1, wherein the crankshaft is disposed in a substantially front-rear direction of the vehicle body.

5. The power unit for a vehicle with an internal combustion engine as set forth in claim 1, wherein the acute angle with the axis of the cylinder center axis of the cylinder block is about 10°.

6. The power unit for a vehicle with an internal combustion engine as set forth in claim 2, wherein the crankshaft is disposed in a substantially front-rear direction of the vehicle body.

7. A power unit for a vehicle with an internal combustion engine, the power unit comprising:
    an internal engine having a cylinder block having a cylinder center axis directed substantially in the vertical direction and a crankshaft;
    transmission means for speed-changing a rotation from the crankshaft, the transmission means including a swash plate oil hydraulic pump and a swash plate oil hydraulic motor disposed coaxially; and
    reciprocating means for reciprocating a drive member for changing a swash plate angle of the swash plate type oil hydraulic motor or the swash plate type oil hydraulic pump,
    wherein the reciprocating means is disposed at a position on an upper side of the transmission means and in parallel to an axis of the transmission means, and a plane connecting an axis of the reciprocating means and the axis of the transmission means does not intersect with an axis of the crankshaft, and intersects with the axis of the cylinder center axis of the cylinder block at a position on a lower side of the axis of the crankshaft while making an acute angle with the axis of the cylinder center axis of the cylinder block.

8. The power unit for a vehicle with an internal combustion engine as set forth in claim 7, the power unit further comprising:
    sensor means for detecting a speed change ratio of the transmission means disposed on a lateral side of the transmission means at a substantially right angle to the axis of the transmission means, in relation to the plane connecting the axis of the reciprocating means and the axis of the transmission means.

9. The power unit for a vehicle with an internal combustion engine as set forth in claim 7, wherein a crankcase for bearing the crankshaft incorporates the transmission means and the reciprocating means therein, and a breather chamber is disposed on or in the vicinity of an extended axis of the reciprocating means in the crankcase.

10. The power unit for a vehicle with an internal combustion engine as set forth in claim 7, wherein the crankshaft is disposed in a substantially front-rear direction of the vehicle body.

11. The power unit for a vehicle with an internal combustion engine as set forth in claim 7, wherein the acute angle with the axis of the cylinder center axis of the cylinder block is about 10°.

12. The power unit for a vehicle with an internal combustion engine as set forth in claim 8, wherein the crankshaft is disposed in a substantially front-rear direction of the vehicle body.

13. The power unit for a vehicle with an internal combustion engine as set forth in claim 1, wherein said crankcase includes an oil tank chamber on a side of said crankshaft opposite from said static oil hydraulic non-stage transmission, said power unit being balanced on opposite sides of said crankshaft by oil in said oil tank chamber and said static oil hydraulic non-stage transmission.

* * * * *